United States Patent
Takakura et al.

(10) Patent No.: US 8,976,193 B2
(45) Date of Patent: Mar. 10, 2015

(54) INFORMATION PROCESSING APPARATUS, INFORMATION PROCESSING METHOD, AND COMPUTER PROGRAM

(75) Inventors: Hiroki Takakura, Tokyo (JP); Shiro Miyagi, Tokyo (JP); Yoshihiro Yamaguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 1213 days.

(21) Appl. No.: 11/754,582

(22) Filed: May 29, 2007

(65) Prior Publication Data

US 2007/0279438 A1 Dec. 6, 2007

(30) Foreign Application Priority Data

Jun. 5, 2006 (JP) ................ P2006-155528

(51) Int. Cl.
*G09G 5/00* (2006.01)
*G06F 17/30* (2006.01)
*G06F 3/0481* (2013.01)

(52) U.S. Cl.
CPC ........ *G06F 17/30265* (2013.01); *G06F 3/0481* (2013.01)
USPC ........... 345/619; 345/629; 345/638; 345/622; 345/660; 345/667; 345/670; 382/291; 382/298; 382/276; 382/100; 382/224; 701/420; 701/421; 701/438; 701/454; 701/445

(58) Field of Classification Search
USPC .......................... 345/619–689; 709/202–203; 715/200–866; 716/1–21; 342/351–358; 382/291, 298, 276, 100, 103, 224; 701/420, 421, 438, 454, 445
See application file for complete search history.

(56) References Cited

U.S. PATENT DOCUMENTS

| | | | |
|---|---|---|---|
| 6,377,210 B1 * | 4/2002 | Moore | 342/357.4 |
| 6,437,797 B1 * | 8/2002 | Ota | 345/638 |
| 6,504,571 B1 * | 1/2003 | Narayanaswami et al. | 348/231.99 |
| 7,117,199 B2 * | 10/2006 | Frank et al. | 1/1 |
| 7,158,151 B2 * | 1/2007 | Asami | 345/629 |
| 7,379,811 B2 * | 5/2008 | Rasmussen et al. | 701/208 |

(Continued)

FOREIGN PATENT DOCUMENTS

| JP | 2001-160058 | 6/2001 |
|---|---|---|
| JP | 2001-215123 | 8/2001 |

(Continued)

OTHER PUBLICATIONS

U.S. Appl. No. 11/753,246, filed May 24, 2007, Takakura, et al.

(Continued)

*Primary Examiner* — Abderrahim Merouan
(74) *Attorney, Agent, or Firm* — Oblon, McClelland, Maier & Neustadt, L.L.P.

(57) ABSTRACT

An information processing apparatus that executes information display processing is disclosed. The apparatus includes: a display unit that executes information display; and a data processing unit that executes a control of the information display of the display unit and data processing based on a user input. The data processing unit displays an image browsing screen, which corresponds to image data stored in a storage unit, on the display unit and executes display of a map at the position, which corresponds to position information included in attribute information of a selected image, on the basis of a user's input of image selection information and map display request.

21 Claims, 16 Drawing Sheets

(56) References Cited

U.S. PATENT DOCUMENTS

| | | | |
|---|---|---|---|
| 7,423,771 B2 * | 9/2008 | Ohata et al. | 358/1.15 |
| 7,492,966 B2 * | 2/2009 | Watanabe | 382/291 |
| 8,145,703 B2 * | 3/2012 | Frishert et al. | 709/203 |
| 8,311,733 B2 * | 11/2012 | Jung et al. | 701/409 |
| 2002/0048054 A1 * | 4/2002 | Ohata et al. | 358/500 |
| 2002/0054162 A1 * | 5/2002 | Fujihara | 345/846 |
| 2003/0063133 A1 * | 4/2003 | Foote et al. | 345/850 |
| 2003/0182052 A1 * | 9/2003 | DeLorme et al. | 701/201 |
| 2004/0001114 A1 * | 1/2004 | Fuchs et al. | 345/855 |
| 2005/0131585 A1 * | 6/2005 | Luskin et al. | 701/1 |
| 2005/0162444 A1 * | 7/2005 | Asami | 345/619 |
| 2005/0222765 A1 * | 10/2005 | Kobuya et al. | 701/210 |
| 2005/0262194 A1 * | 11/2005 | Mamou et al. | 709/203 |
| 2005/0270311 A1 * | 12/2005 | Rasmussen et al. | 345/677 |
| 2006/0004680 A1 * | 1/2006 | Robarts et al. | 706/12 |
| 2006/0142942 A1 * | 6/2006 | Pyo | 701/211 |
| 2006/0181546 A1 * | 8/2006 | Jung et al. | 345/619 |
| 2007/0038362 A1 * | 2/2007 | Gueziec | 701/117 |
| 2008/0074423 A1 * | 3/2008 | Gan et al. | 345/427 |
| 2008/0109153 A1 * | 5/2008 | Gueziec | 701/117 |
| 2008/0204317 A1 * | 8/2008 | Schreve et al. | 342/357.13 |
| 2009/0073191 A1 * | 3/2009 | Smith et al. | 345/629 |

FOREIGN PATENT DOCUMENTS

| | | |
|---|---|---|
| KR | 10-2001-0094546 | 11/2001 |
| KR | 10-2003-0005059 | 1/2003 |

OTHER PUBLICATIONS

U.S. Appl. No. 12/968,392, filed Dec. 15, 2010, Takakura, et al.
U.S. Appl. No. 13/346,296, filed Jan. 9, 2012, Takakura, et al.
Masakatsu Nagayama, "The One Rank Higher Arrangement and Use by Using an Image Management Software, Digital Image Arrangement Technique", Touch PC, Mainichi Communications Co., Ltd., Mar. 24, 2000, vol. 5, No. 3, pp. 60-69.
Korean Office Action issued Jan. 28, 2014, in Korea Patent Application No. 10-2007-0054437 (with English translation).

* cited by examiner

FIG. 5

| IMAGE FILE PATH | IMAGE CACHE PATH (THUMBNAIL) | IMAGE POSITION INFORMATION (LONGITUDE, LATITUDE) | IMAGE PHOTOGRAPHING DATE AND TIME INFORMATION | OTHER ATTRIBUTE INFORMATION |
|---|---|---|---|---|
| C:¥Doc¥abc¥0001.jpg | C:¥Doc¥pqr¥0001.jpg | (20.43.21, 125.24.45) | 2006.4.21, 12:42:12 | ... |
| C:¥Doc¥abc¥0002.jpg | C:¥Doc¥pqr¥0012.jpg | (23.42.11, 124.23.11) | 2006.5.22, 14:12:05 | ... |
| ... | ... | ... | ... | ... |
| C:¥Doc¥def¥0321.jpg | C:¥Doc¥stu¥0234.jpg | (21.23.15, 125.43.23) | 2006.5.26, 12:05:51 | ... |

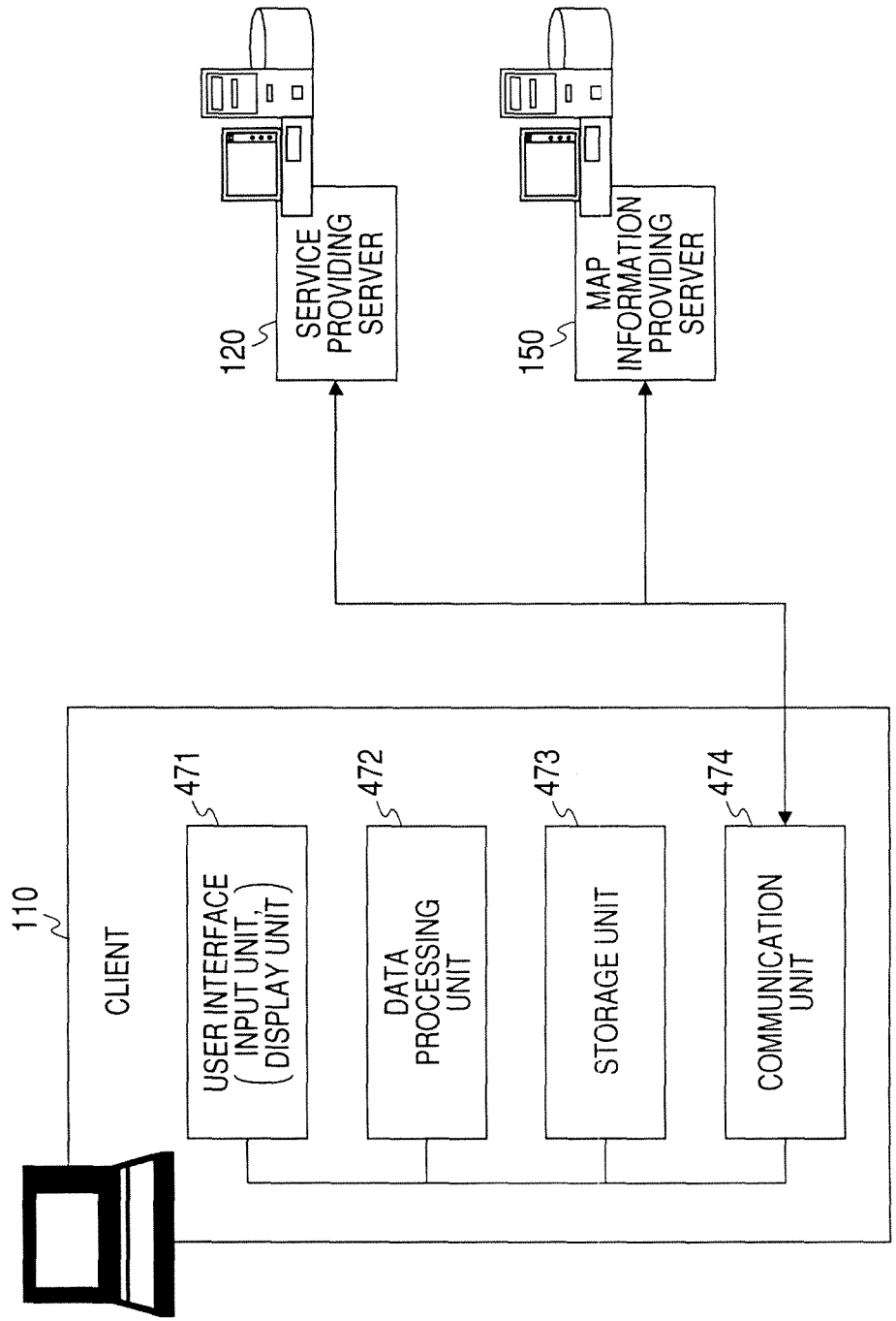

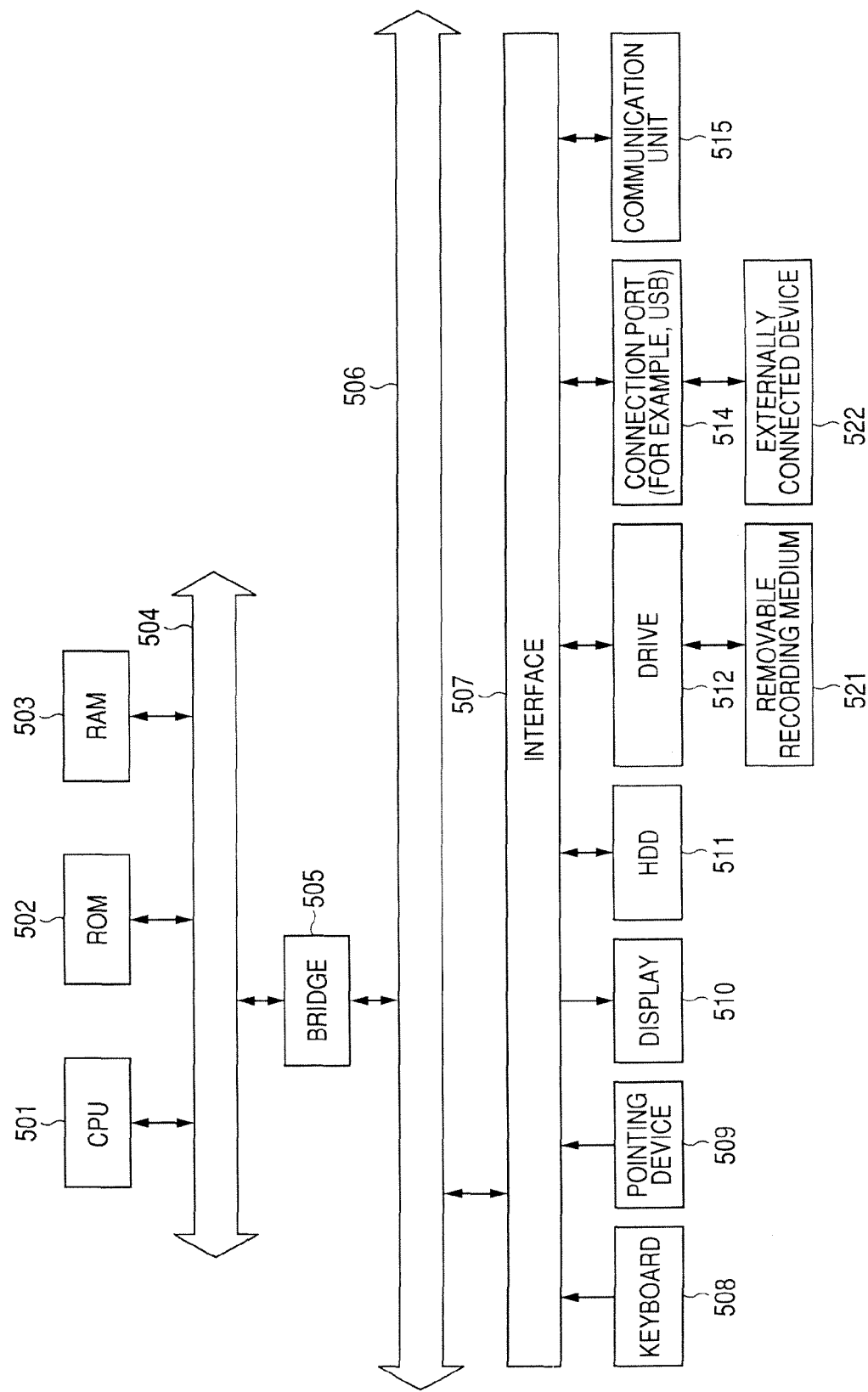

INFORMATION PROCESSING APPARATUS, INFORMATION PROCESSING METHOD, AND COMPUTER PROGRAM

CROSS REFERENCES TO RELATED APPLICATIONS

The present invention contains subject matter related to Japanese Patent Application JP 2006-155528 filed in the Japanese Patent Office on Jun. 5, 2006, the entire contents of which being incorporated herein by reference.

BACKGROUND OF THE INVENTION

1. Field of the Invention

The present invention relates to an information processing apparatus, an information processing method, and a computer program. More specifically, the present invention relates to an information processing apparatus, an information processing method, and a computer program for displaying map information, image data held in an information processing apparatus, such as a user's PC or digital camera, and the like are displayed together.

2. Description of the Related Art

Digital cameras widely used in recent years are apparatuses that convert still images or motion pictures imaged by an imaging device, such as a CCD sensor, into digital-format image data and record the image data as digital data in a recording medium, for example, a memory card, a flash memory, or a hard disk.

In these digital cameras, photographed image data is stored in a recording medium in a format specified beforehand. Among many image formats, for example, in the case of an EXIF format in JPEG or a format of DV data, a field used to record a photographing position may be defined. For example, in a camera having a GPS function, processing for automatically measuring the photographing position and recording the measured position as attribution information of photographed data is executed. Such position information corresponding to images is used, for example, in a case of displaying a map in order to display the photographing position on the map.

For example, there is a map information providing service as one of the services through a network. The map information providing service refers to a service in which a request of map display of, for example, a specific area is transmitted from a user terminal, such as a computer or a portable terminal, connected to a network to a map information providing server and the map information providing server having received the request acquires a map of the area corresponding to the request and then transmits the acquired map to the user terminal. There is also a service that provides a satellite photograph other than a map.

In conjunction with such map information providing service, there is a service that allows data that a user holds, for example, image data photographed in travel places to be displayed on the positions on a map provided by a map providing server. For example, as shown in FIG. 1, a marker 12 is set on the position corresponding to a place, to which a user has traveled, on a map 10 provided by a map providing server. The marker 2 is a marker for local image pop-up. An image 11 corresponding to photographs taken by the user is displayed by designating (for example, clicking) each marker. When each of the markers 12a to 12n is clicked, local image data corresponding to each position, for example, the user's image (for example, photograph taken during travel) 11 pops up.

In order to realize such information display, it is necessary to create a display structure description file, which describes the configuration for displaying map data, position information of a marker, and image information such as user's photographs according to a predetermined rule, for example, an HTML file. A user creates display data (HTML file) or requests the display data (HTML file) to a service providing server to create the display data (HTML file) and performs data display on the basis of the created HTML file.

In order to allow a map, satellite photographs, and the like, which are shown in FIG. 1, to be displayed together with user's local images so as to be linked to each other, for example, an AJAX (Asynchronous Java (registered trademark) Script+XML) technique is used. The AJAX technique uses an HTTP communication function of Java (registered trademark) script provided in a web browser. The AJAX technique is an interactive web application technique of enabling processing, such as updating of display data, by performing transmission/reception of XML-format data to/from a server without reloading a web page. In addition, the AJAX technique is mainly applied in a network service operating on an Internet browser.

Thus, by applying the AJAX technique, for example, it becomes possible to display an image, such as a user's local photograph, in combination with map or satellite photograph information provided by a map information providing server.

For example, the map information providing server issues an API (application program interface) key to the service providing server which is granted a right to create an HTML file or XML file, such that the key information is written in the HTML file or XML file created by the service providing server. Then, only when the key information is confirmed, it is allowed to use the API of the map information providing server, such that the data display processing shown in FIG. 1 is performed. For example, in the case when an HTML file stored in a local place on a personal computer is used, the utilization of the API of the map information providing server is not permitted by the above processing. Accordingly, the data display shown in FIG. 1, that is, an operation of causing a local image to pop up on a map is not possible, and thus service providing based on a license is realized.

As described above, by setting map information acquired from, for example, a map information providing server such that markers are set on the positions corresponding to position information (latitude, longitude) set as attribute information of images, such as photographs taken by a user and each image corresponding to the position pops up by operation (clicking) of a corresponding marker, the user can correctly see the photographing position of each photograph on a map.

However, the temporal relation of photographing date and time is not visually confirmed by simply displaying images on a map. Further, position information on all photographed image data that a user holds is not necessarily recorded. For images to which position information is not granted, positions are not set on a map, and accordingly, there occurs a problem that display processing associated with the map cannot be executed. Furthermore, there is also a problem that additional recording of position information with respect to the images, to which the position information is not granted, cannot be performed easily.

SUMMARY OF THE INVENTION

Therefore, in view of the above, it is desirable to provide an information processing apparatus, an information processing method, and a computer program that make it possible to easily visually recognize photographing positions and temporal relation of display images and have a user interface allowing an image, which is not associated with position information, to be associated with the position information in a simple way in the configuration in which a map and images are displayed together.

According to a first embodiment of the present invention, there is provided an information processing apparatus that executes information display processing including: a display unit that executes information display; and a data processing unit that executes a control of the information display of the display unit and data processing based on a user input. The data processing unit displays an image browsing screen, which corresponds to image data stored in a storage unit, on the display unit and executes display of a map at the position, which corresponds to position information included in attribute information of a selected image, on the basis of a user's input of image selection information and map display request.

In the information processing apparatus according to the first embodiment of the present invention, preferably, the data processing unit executes display of a map at the position corresponding to position information included in attribution information of an image having newest or oldest date and time information included in attribute information of images selected by the user.

Further, in the information processing apparatus according to the first embodiment of the present invention, preferably, the data processing unit executes display of a map in which a position marker corresponding to position information included in attribute information of a selected image is set.

Furthermore, in the information processing apparatus according to the first embodiment of the present invention, preferably, the data processing unit executes processing for reading and displaying image data in which position information corresponding to the set position of the marker is set as attribute information on the basis of a user's operation on the marker.

Furthermore, in the information processing apparatus according to the first embodiment of the present invention, preferably, the data processing unit executes map information display processing for creating or acquiring an information display file, in which image reference information as access information corresponding to a selected image is set, on the basis of the user's input of image selection information and map display request and displaying a map and the selected image together.

Furthermore, in the information processing apparatus according to the first embodiment of the present invention, preferably, the data processing unit executes processing for displaying an image list, which is a list of images selected on the basis of the image selection information by the user, together with the map at the time of the map information display processing.

Furthermore, in the information processing apparatus according to the first embodiment of the present invention, preferably, the data processing unit executes processing for displaying an identification icon indicating whether or not position information is recorded in attribution information corresponding to a display image on the image list.

Furthermore, in the information processing apparatus according to the first embodiment of the present invention, preferably, the data processing unit executes processing for acquiring position information, which corresponds to the map position of a place where a display image of the image list is dragged and dropped, on the basis of user's dragging and dropping of the display image of the image list onto a display map and then recording the acquired position information as position information corresponding to an image to be dragged and dropped.

Furthermore, in the information processing apparatus according to the first embodiment of the present invention, preferably, the position information is recorded in an image file together with the dragged and dropped image data.

Furthermore, in the information processing apparatus according to the first embodiment of the present invention, preferably, the data processing unit executes data saving processing for newly creating or updating selected image group information on images selected at the time of display of the map information and then saving the newly created or updated image group information, and the image group information includes at least reference information of the selected image data.

Furthermore, in the information processing apparatus according to the first embodiment of the present invention, preferably, the data processing unit executes processing for saving position information corresponding to an image as constituent data at the time of the data saving processing.

Furthermore, in the information processing apparatus according to the first embodiment of the present invention, preferably, the data processing unit executes processing for saving a map, which is being displayed on the display unit, or access information of the map as constituent data at the time of the data saving processing.

Furthermore, in the information processing apparatus according to the first embodiment of the present invention, preferably, the data processing unit executes processing for saving a display structure description file, which is applied for display of information being displayed on the display unit, as constituent data at the time of the data saving processing.

In addition, in the information processing apparatus according to the first embodiment of the present invention, preferably, the display structure description file is an HTML file.

Further, according to a second embodiment of the present invention, there is provided an information processing method executed in an information processing apparatus including the step of: data processing in which an information display control on a display unit and data processing based on a user input are executed in a data processing unit. The data processing includes processing for displaying an image browsing screen, which corresponds to image data stored in a storage unit, on the display unit and executing display of a map at the position, which corresponds to position information included in attribute information of a selected image, on the basis of a user's input of image selection information and map display request.

In the information processing method according to the second embodiment of the present invention, preferably, the data processing includes processing for executing display of a map at the position corresponding to position information included in attribution information of an image having newest or oldest date and time information included in attribute information of images selected by the user.

Further, in the information processing method according to the second embodiment of the present invention, preferably, the data processing includes processing for executing display of a map in which a position marker corresponding to position information included in attribute information of a selected image is set.

Furthermore, in the information processing method according to the second embodiment of the present invention, preferably, the data processing includes processing for reading and displaying image data in which position information corresponding to the set position of the marker is set as attribute information on the basis of a user's operation on the marker.

Furthermore, in the information processing method according to the second embodiment of the present invention, preferably, the data processing includes map information display processing for creating or acquiring an information display file, in which image reference information as access information corresponding to a selected image is set, on the basis of the user's input of image selection information and map display request and displaying a map and the selected image together.

Furthermore, in the information processing method according to the second embodiment of the present invention, preferably, the data processing includes processing for displaying an image list, which is a list of images selected on the basis of the image selection information by the user, together with the map at the time of the map information display processing.

Furthermore, in the information processing method according to the second embodiment of the present invention, preferably, the data processing includes processing for displaying an identification icon indicating whether or not position information is recorded in attribution information corresponding to a display image on the image list.

Furthermore, in the information processing method according to the second embodiment of the present invention, it is preferable to further include the step of executing processing for acquiring position information, which corresponds to the map position of a place where a display image of the image list is dragged and dropped, on the basis of user's dragging and dropping of the display image of the image list onto a display map and then recording the acquired position information as position information corresponding to an image to be dragged and dropped by means of the data processing unit.

Furthermore, in the information processing method according to the second embodiment of the present invention, preferably, the position information is recorded in an image file together with the dragged and dropped image data.

Furthermore, in the information processing method according to the second embodiment of the present invention, it is preferable to further include the step of executing data saving processing for newly creating or updating and then saving, with respect to images selected at the time of display of the map information, selected image group information including at least reference information of the selected image data by means of the data processing unit.

Furthermore, in the information processing method according to the second embodiment of the present invention, preferably, the data saving processing is processing for saving data including position information corresponding to an image.

Furthermore, in the information processing method according to the second embodiment of the present invention, preferably, the data saving processing is processing for saving data including a map, which is being displayed on the display unit, or access information of the map.

Furthermore, in the information processing method according to the second embodiment of the present invention, preferably, the data saving processing is processing for saving data including a display structure description file applied for display of information being displayed on the display unit.

In addition, in the information processing method according to the second embodiment of the present invention, preferably, the display structure description file is an HTML file.

Further, according to a third embodiment of the present invention, a computer program that causes an information processing apparatus to execute information processing causes the information processing apparatus to execute data processing in which an information display control on a display unit and data processing based on a user input are executed in a data processing unit. In the data processing, processing for displaying an image browsing screen, which corresponds to image data stored in a storage unit, on the display unit and displaying a map at the position, which corresponds to position information included in attribute information of a selected image, on the basis of a user's input of image selection information and map display request is included.

In addition, the computer program according to the third embodiment of the present invention is a computer program that may be supplied to a computer system capable of executing a variety of programs/codes by the use of a storage medium or a communication medium supplied in a computer-readable format. For example, the computer program may be supplied by the use of a recording medium such as a CD, an FD, and an MO, or a communication medium such as a network. By supplying the program in the computer-readable format, processing corresponding to the program is realized in the computer system.

Additional purposes, characteristics, and advantages of the present invention will be apparent by detailed description made with reference to the accompanying drawings in the following embodiment of the present invention. Furthermore, the system in the specification is a logic group of a plurality of apparatuses. That is, the system in the specification is not limited to a system in which apparatuses having respective configurations exist in the same casing.

According to the configuration according to the embodiment of the present invention, it is possible to easily visually recognize photographing positions and temporal relation of display images and to cause an image, which is not associated with position information, to be associated with the position information in a simple way in the configuration in which a map and images are displayed together. In the configuration of the information processing apparatus according to the embodiment of the present invention, an image list in which local data, such as photographs, stored in a storage unit of a client is arranged in the order of photographing date and time is displayed together with map information provided by a map information providing server, for example. Moreover, an identification icon indicating whether or not the position information is associated with a display image is set on the display image. In addition, by dragging and dropping an image, which is not associated with position information, on the map, the position information on the map where the image is dragged and dropped may be acquired and set as the position information of the image.

BRIEF DESCRIPTION OF THE DRAWINGS

FIG. 5 is a view illustrating an example of upload data transmitted from a client to a service providing server;

FIG. 15 is a view explaining the functional configuration of an information processing apparatus serving as a client; and FIG. 16 is a view explaining an example of the hardware configuration of an information processing apparatus serving as a client.

DESCRIPTION OF THE PREFERRED EMBODIMENTS

Hereinafter, an information processing apparatus, an information processing method, and a computer program according to embodiments of the present invention will be described in detail with reference to the accompanying drawings.

Figure 1:
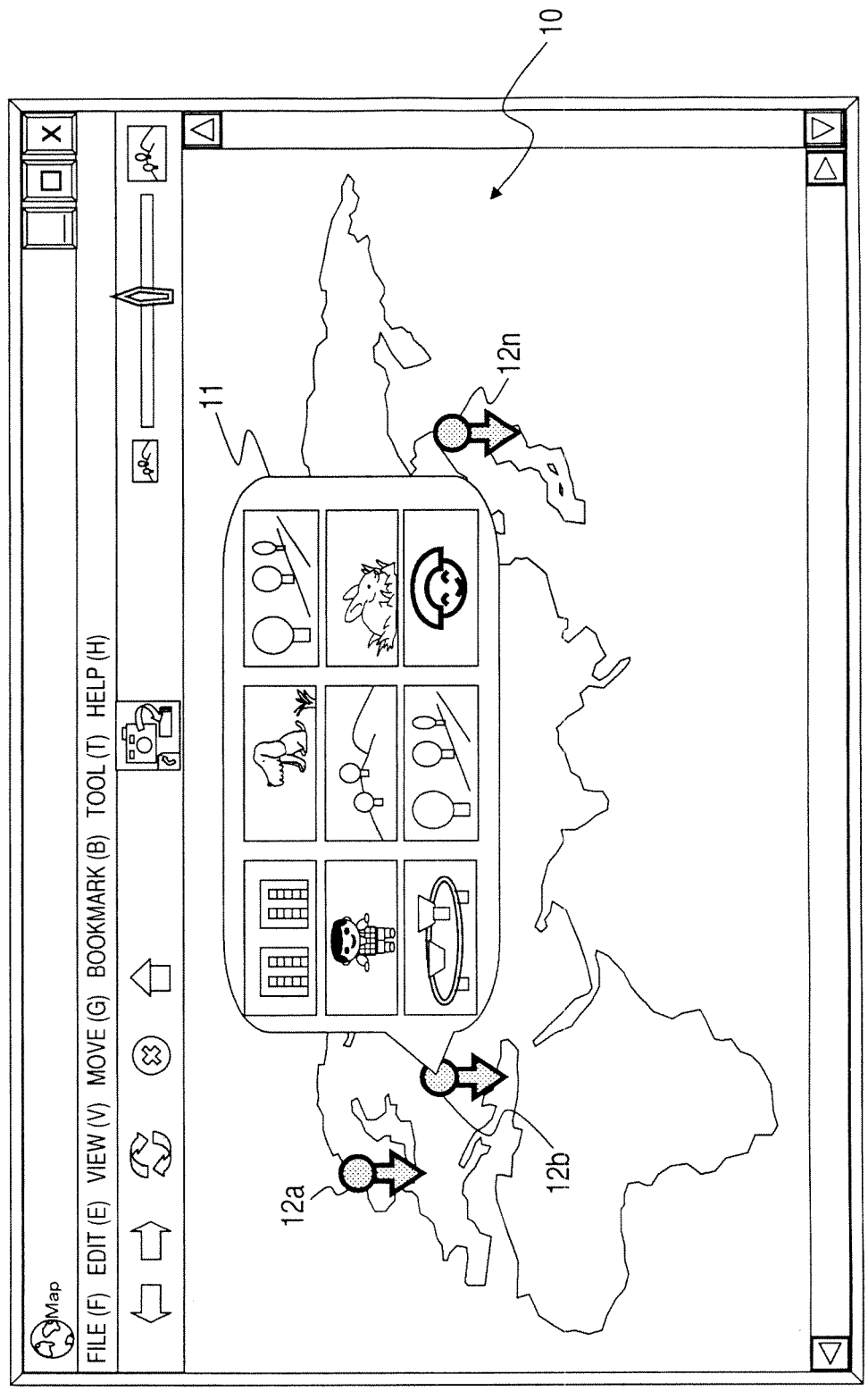
FIG. 1 is a view illustrating an example of display data in which image data that a user holds is displayed together with map information.
Figure 2:
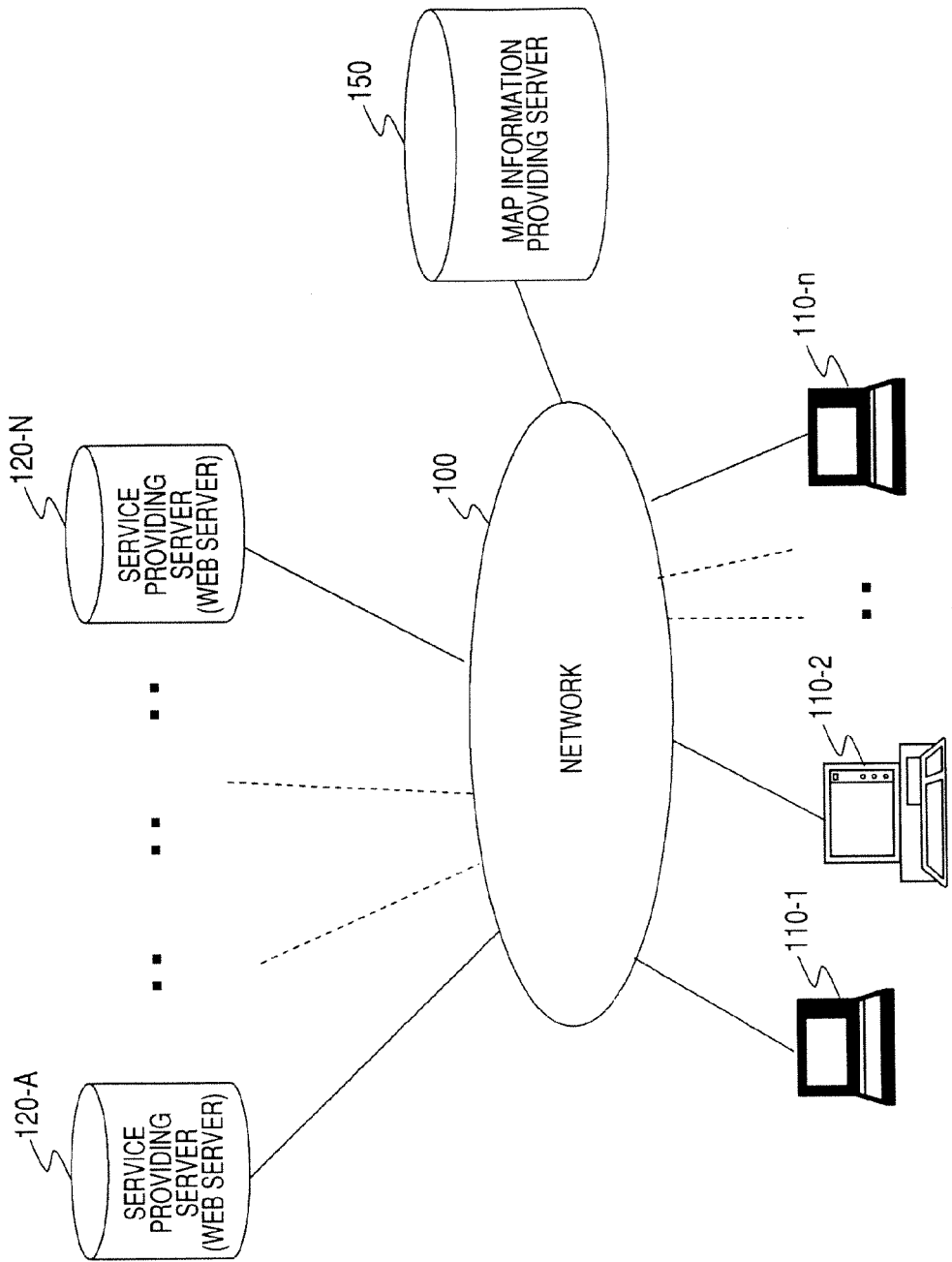
FIG. 2 is a view explaining an example in which an information processing apparatus according to an embodiment of the present invention is used.

First, an example in which an information processing apparatus according to an embodiment of the present invention is used will be described with reference to FIG. 2. A network 100 shown in FIG. 2 is a network, such as Internet and intranet. Service providing servers (web servers) 120-A to 120-N that provide various kinds of services, a map information providing server 150 that provides map information, and clients 110-1 to 110-n that perform processing for displaying the display data described above with reference to FIG. 1, that is, processing for displaying local image data, such as photographs, together with map information provided by the map information providing server 150 are connected to the network 100. In addition, maps, satellite photographs, aerial photographs, and the like, that is, various kinds of information serving as maps is included in the map information provided by the map information providing server 150.

The clients 110-1 to 110-n serving as user terminals are information processing apparatuses, such as a PC, a digital camera, and a mobile phone. For example, local data including image data, such as photographs taken at tourist spots, are stored in a storage medium, such as a hard disk, a flash memory, and an optical disk.

The client 110 acquires map information and satellite photograph information provided by the map information providing server 150 and executes processing for displaying the acquired information together with local data, such as photographic images, stored in a storage medium, such as a hard disk. A display structure description file applied in the display processing, for example, a data file such as an XML file or an HTML file is received from a service providing server (web server) 120.

In the network configuration shown in FIG. 2, the client 110 is set to receive a data file, such as an XML file or an HTML file, applied in display processing from the service providing server (web server) 120 and receive map information from the map information providing server 150. Processing for creating a display structure description file, such as the XML file or HTML file, applied in the display processing may be executed in the client. In addition, map data held in the client may be applied as map information without receiving the map information from an external server. In this case, communication through network connection is not required. That is, it is possible to create and display the display data described above with reference to FIG. 1 only with processing in the client.

Path information corresponding to image data, such as image files, stored in the client 110, that is, file path information (for example, c:¥Doc¥file0001.jpg) which is image reference information as access information indicating a storage place, such as a hard disk, is recorded in an HTML file created by the client 110 or the service providing server (web server) 120. On the basis of the path information, an image file is read from a storage unit of the client 110 to be then displayed.

Figure 3:
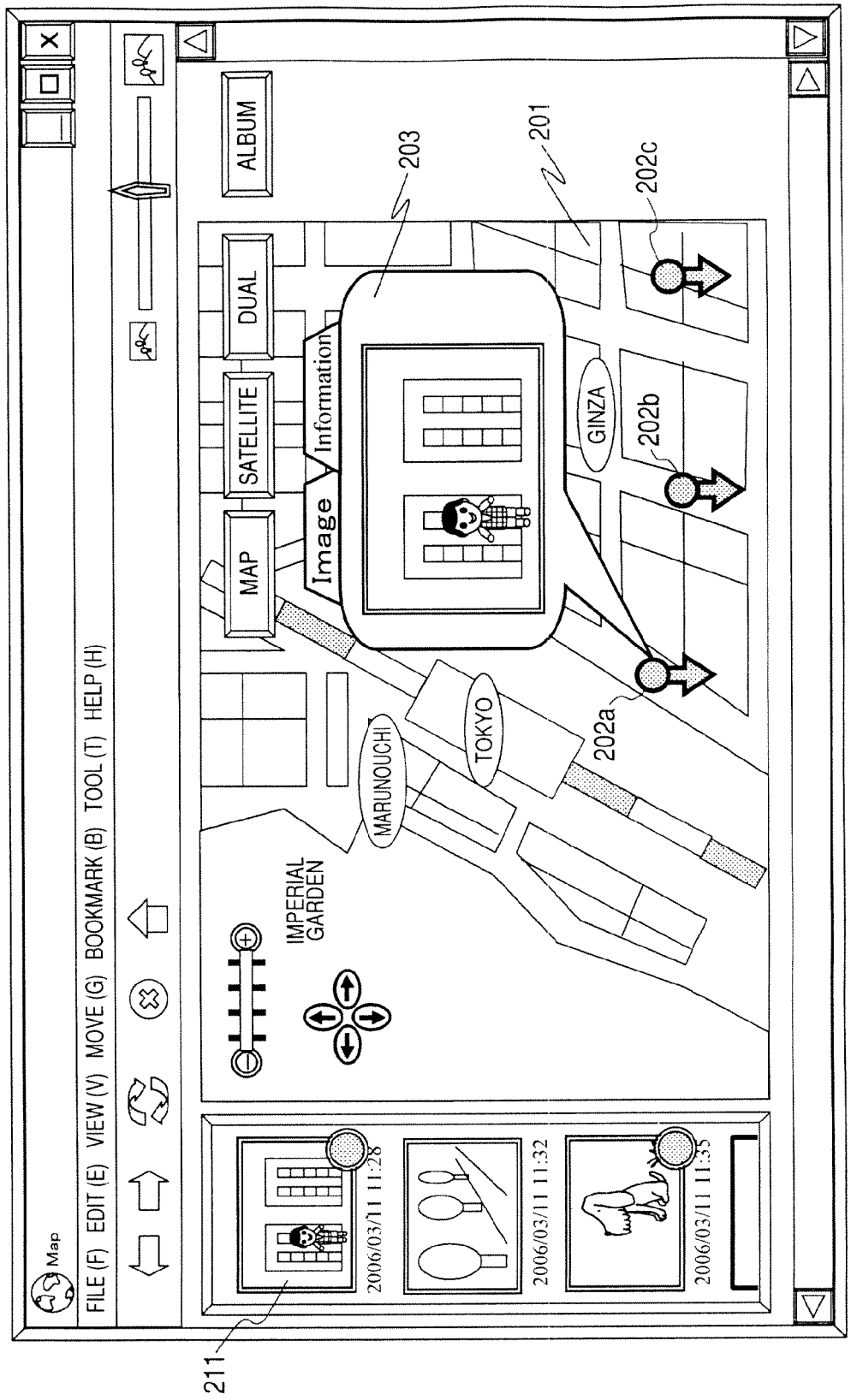
FIG. 3 is a view illustrating an example of display data displayed on a client.

An example of display data displayed on the client 110 is illustrated in FIG. 3. For example, as shown in FIG. 3, markers 202a to 202n are shown on a map 201 that the map information providing server 150 provides. These markers are set at corresponding positions on the basis of position information corresponding to the image file.

An image 203 corresponding to a photograph taken by the user pops up when designating (for example, clicking) each marker. The image data displayed here is data read from the client 110, that is, a storage unit of the client 110 on the basis of file path information set in the HTML file.

As shown in the drawing, tags such as 'Image' and 'Information' are set for an image 203, and a thumbnail image or image data that is read from the client 110, that is, the storage unit of the client 110 on the basis of the image file path is displayed on the tag 'Image'. On the tag 'Information', for example, photographing date and time information, latitude and longitude information indicating photographing position, and file path information of original image data are displayed. Such information is data recorded in the HTML file.

Moreover, as shown in FIG. 3, an image list 211 including a plurality of images is displayed on display data. The list-displayed image is also data that is read from the client 110, that is, the storage unit of the client 110 on the basis of the file path information set in the HTML file.

Figure 4:
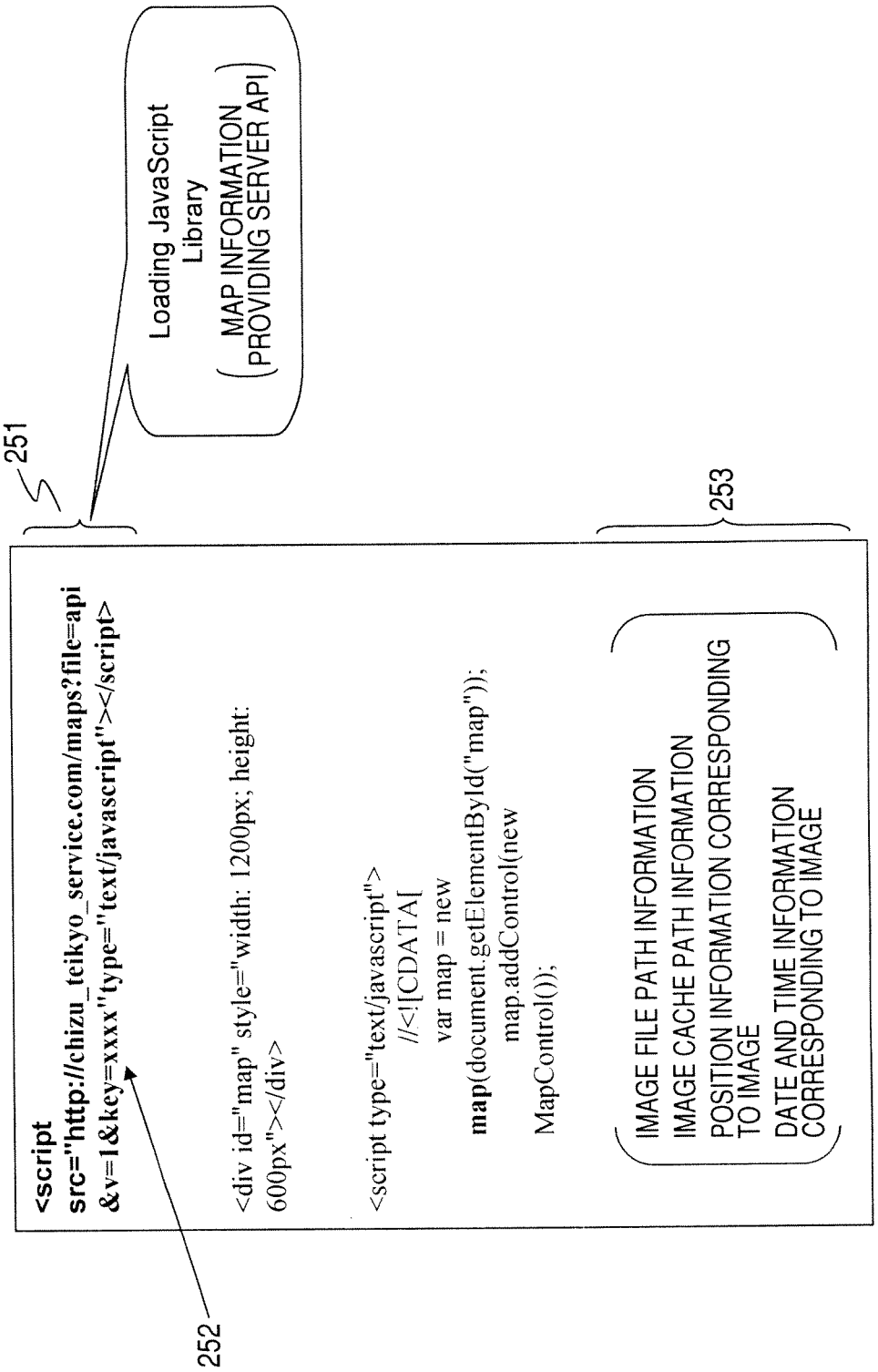
FIG. 4 is an example of an HTML file applied in display processing.

An example of the HTML file corresponding to the display data shown in FIG. 3 is illustrated in FIG. 4. An HTML file shown in FIG. 4 is an example of an HTML file that is created in the service providing server 120 and is then provided to the client 110 in the network configuration shown in FIG. 2. Key information 252 corresponding to license information, which is granted from the map information providing server 150 to the service providing server 120, and code information (Java (registered trademark) script) applied to utilize the API provided by the map information providing server 150 are described in a data part 251 of the HTML file. Further, a data part 253 includes various kinds of data transmitted from the client 110 to the service providing server 120, that is, HTML data configured to include link information, such as (a) image file path information, (b) image cache path information, (c)

image position information (longitude, latitude), and (d) image photographing date and time information, and display format information thereof.

When the client 110 requests the service providing server 120 to create an HTML file, the client 110 transmits data shown in FIG. 5 to the service providing server 120. That is, information including (a) image file path information, (b) image cache path information (file path information on thumbnail image), (c) image position information (longitude, latitude), and (d) image photographing date and time information is transmitted as HTML file creating data.

(a) Image file path information is image file path information as access information corresponding to the image data stored in the client 110, that is, image data, such as photographs taken at tourist spots.

(b) Image cache path information is image file path information as access information of a thumbnail (reduced image) corresponding to an image designated on the basis of the image file path information.

(c) Image position information (longitude, latitude) is location information indicating the photographing location of an image and the like designated on the basis of the image file path information, for example, longitude and latitude information.

(d) Image photographing date and time information is information indicating photographing date and time of an image designated on the basis of the image file path information.

In addition, the image data photographed using a digital camera or the like is recorded in a storage unit of the digital camera in a format of EXIF file, for example. Then, the image data is copied and recorded in a hard disk or the like of the client 110, and path information on each image file is specified according to directory of the hard disk. In addition, path information of an external storage unit, such as a flash memory, connected through USB connection or the like may be applied.

As the position information or the photographing date and time information, data that is recorded as a photographic data file in the EXIF file may be used, or data that is additionally recorded later by the user may be used. In addition, the position information is not limited to the photographing position. For example, the position of a photographic subject, position information associated with an image, and the like may be recorded. Such position information is used to determine the position of a marker set on a map.

Further, (b) image cache path information is the image file path information as access information of a thumbnail (reduced image) corresponding to an image designated on the basis of image file path information. In many cases, a thumbnail image read according to the cache path is used as an image that pops up by an operation of a marker on a map or an image displayed as an image list.

The read image is image data that is actually read on a screen. An image that the user holds after proper processing may be used as the read image. For example, an image subjected to rotation processing or an image subjected to resizing processing may be used as the read image.

Furthermore, (a) image file path information is an original image corresponding to (b) image cache path information. The file path information of the original image is recorded in image information data displayed by designating the tag 'Information' of the pop-up image data described above with reference to FIG. 3 and is used in a case when the user desires to display the original image.

In addition, the image information corresponding to (a) image file path information and (b) image cache path information may be dynamic image data without being limited to still images. In this case, for example, a pop-up image that is displayed by a marker operation on the map is displayed as a dynamic image.

On the basis of data received from the client 110, (a) image file path information, (b) image cache path information (file path information on thumbnail image), (c) image position information (longitude, latitude), and (d) image photographing date and time information, the service providing server 120 shown in FIG. 2 creates an HTML file, which is shown in FIG. 4, corresponding to display data displayed on a display unit of the client 110 and provides the created HTML file to the client 110.

Map information is acquired from the map information providing server 150, for example. In this case, the client 110 executes API utilization request with respect to the map information providing server 150 on the basis of codes (Java (registered trademark) script) for utilizing the API included in the HTML file received from the service providing server 120. In this processing request, position information for indicating the marker position set on a map and the key information 252 included in the data part 251 of the HTML file shown in FIG. 4 are included.

On the basis of the HTML file received from the service providing server 120, the client 110 may call image data and thumbnail image data from itself, that is, a storage unit of the client 110 according to a map received from the map information providing server 150 and pass information recorded in the HTML file and then display the called data.

For example, as shown in FIG. 3, a marker 202 is displayed at the position, which corresponds to a position set as attribution information of an image, on the map and the image corresponding to the marker pops up when clicking on the marker. This processing is processing in which an image stored in the client 110 is read and displayed on the basis of the file path information described in the HTML file.

In addition, in the data display example shown in FIG. 3, the image list display part 211 is set on a left side of a screen, and thumbnail images of which path information is designated when the client 110 requests the service providing server 120 to create the HTML file is displayed on the image list display part 211 in the order of photographing date and time, for example. This image is also the image 224, which is stored in the client 110, read on the basis of the file path information described in the HTML file 222. In addition, the display example shown in FIG. 3 is only an example, and various kinds of data displays are realized according to an HTML file that is created.

In addition, as described above, processing for creating the HTML file or acquisition of the map information may be executed in the client 110 without using an external server. In this case, the processing for creating the HTML file or the acquisition of the map information is executed as processing in which data within the client is applied. In any cases, image data displayed together with a map is read from the storage unit of the client 110 on the basis of (a) image file path information and (b) image cache path information recorded in the HTML file shown in FIG. 4.

Figure 6:
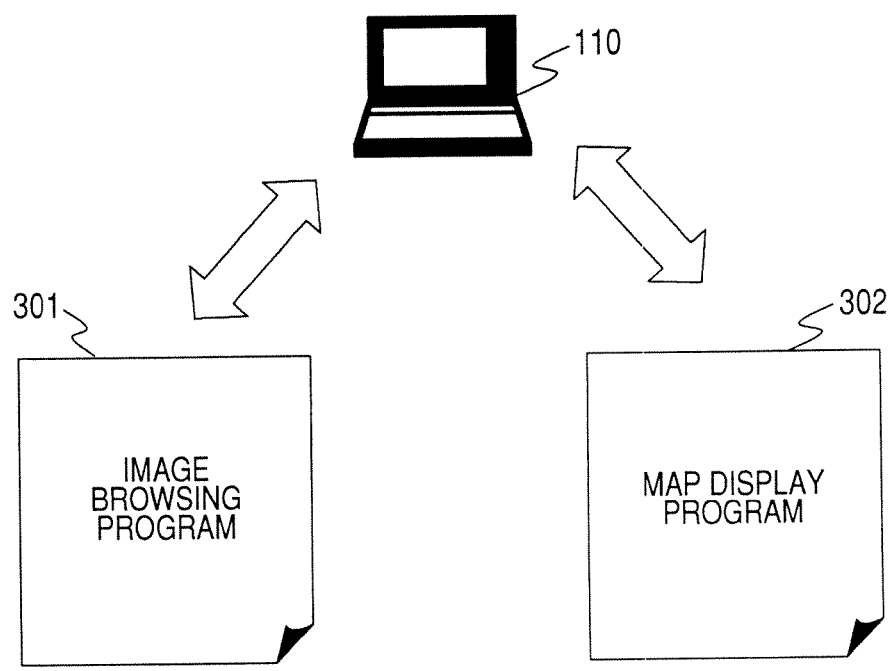
FIG. 6 is a view explaining a program executed in a client.

In the case of displaying data obtained by combining the map with image data such as the photographs shown in FIG. 3, the client 110 selects an image to be displayed and creates an HTML file in which an image file path corresponding to the selection information is set, such that processing for displaying the image together with the map is executed. Accordingly, programs that are executed by the client in such processing are largely divided into an image browsing program 301 and a map display program 302, as shown in FIG. 6. A user of the client 110 executes the image browsing program 301 to select an image file, which is desired to be displayed on the map, from images stored in the storage unit of the client 110. Then, the user creates an HTML file in which image file path information corresponding to the selected image file is set and then executes the map display program 302 such that data described above with reference to FIG. 3 is displayed.

Figure 7:
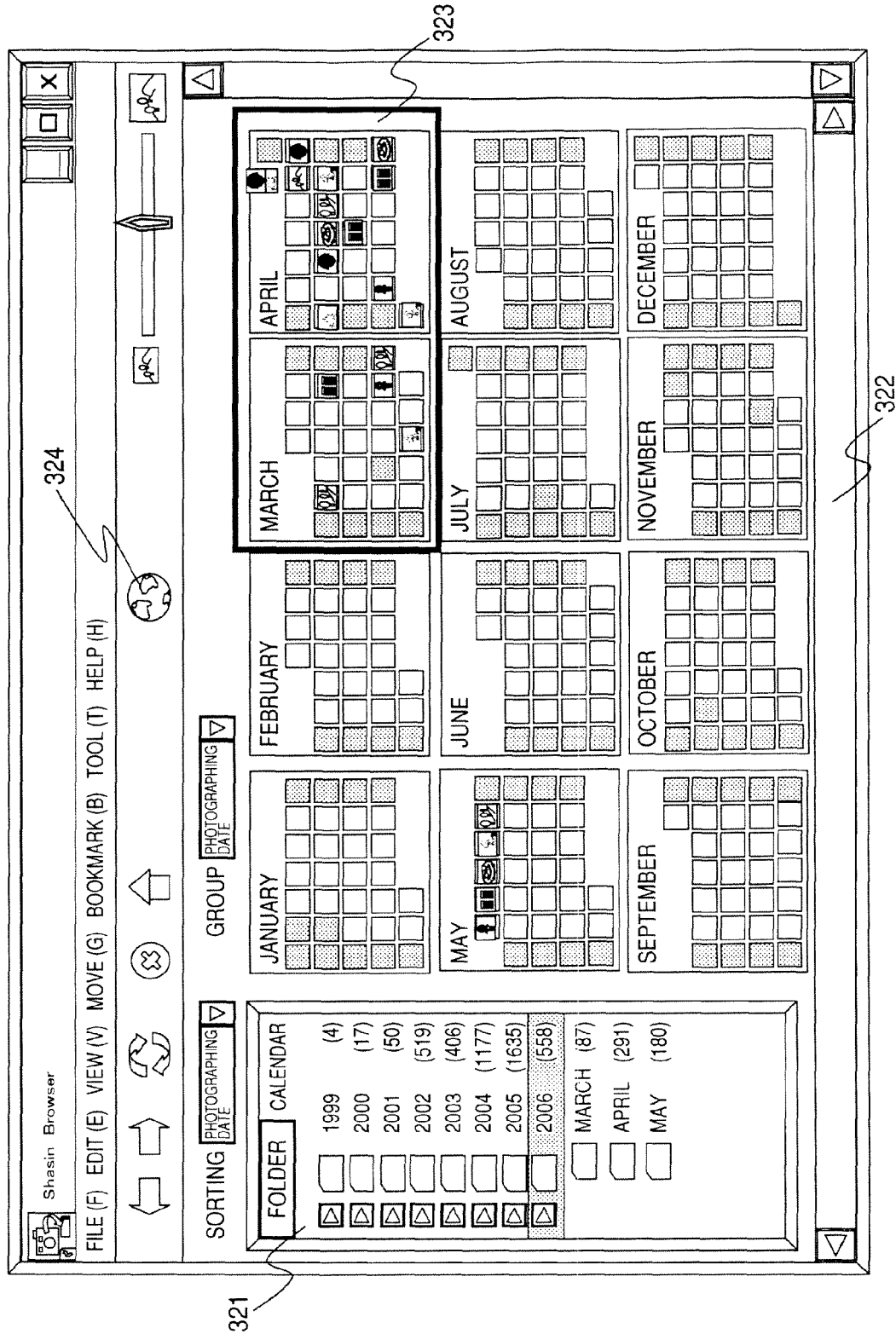
FIG. 7 is a view explaining an example of data displayed on the basis of execution of an image browsing program in a client.

Hereinafter, an example of execution of the image browsing program 301 will be described with reference to FIGS. 7 and 8. FIG. 7 illustrates an example of data displayed on a display of the client 110 in a case when an image browsing program for executing image browsing in the form of a calendar is executed. As shown in a column of a folder list 321 in the drawing, each image data is stored in year-unit folders. Further, month-unit folders are stored in each of the year-unit folders, and image data files, such as photographs, are recorded in each of the month-unit folders. At the time of data recording after photographing processing, the image data is recorded in respective folders on the basis of photographing date and time information set as attribution information of images.

The image browsing example shown in FIG. 7 is an example of a case of designating and browsing year-unit folders corresponding to year 2006. Specifically, a calendar is displayed in an image list display region 322, and a representative image of images having photographing data and time set is displayed corresponding to each date. For example, a thumbnail of a head image having the earliest photographing time in each date is displayed on a date area of the calendar.

For example, a user sets an image that the user desires to display together with map display on the basis of the list display. In the example shown in the drawing, regions of March and April are set as an image selection region 323. By starting the map display program after setting the image selection region 323, the selected images are set as an object of list display of an image list or pop-up images described above with reference to FIG. 3. The processing for starting the map display program is executed by clicking on a map display program starting icon 324 shown in the drawing.

By clicking on the map display program starting icon 324, the map display program starts, the HTML file described above is created, and a map is read and displayed. Pass information on a selected image is described in the created HTML file. In addition, if necessary, it may be possible to execute processing for creating a processed image, such as a thumbnail, of the selected image, to store the created processed image in a primary folder, and to record even path information (cache path) corresponding to the processed image in an HTML file so as to be read and displayed at the time of map display processing. Specific processing sequences after starting of the map display program will be described later.

Figure 8:
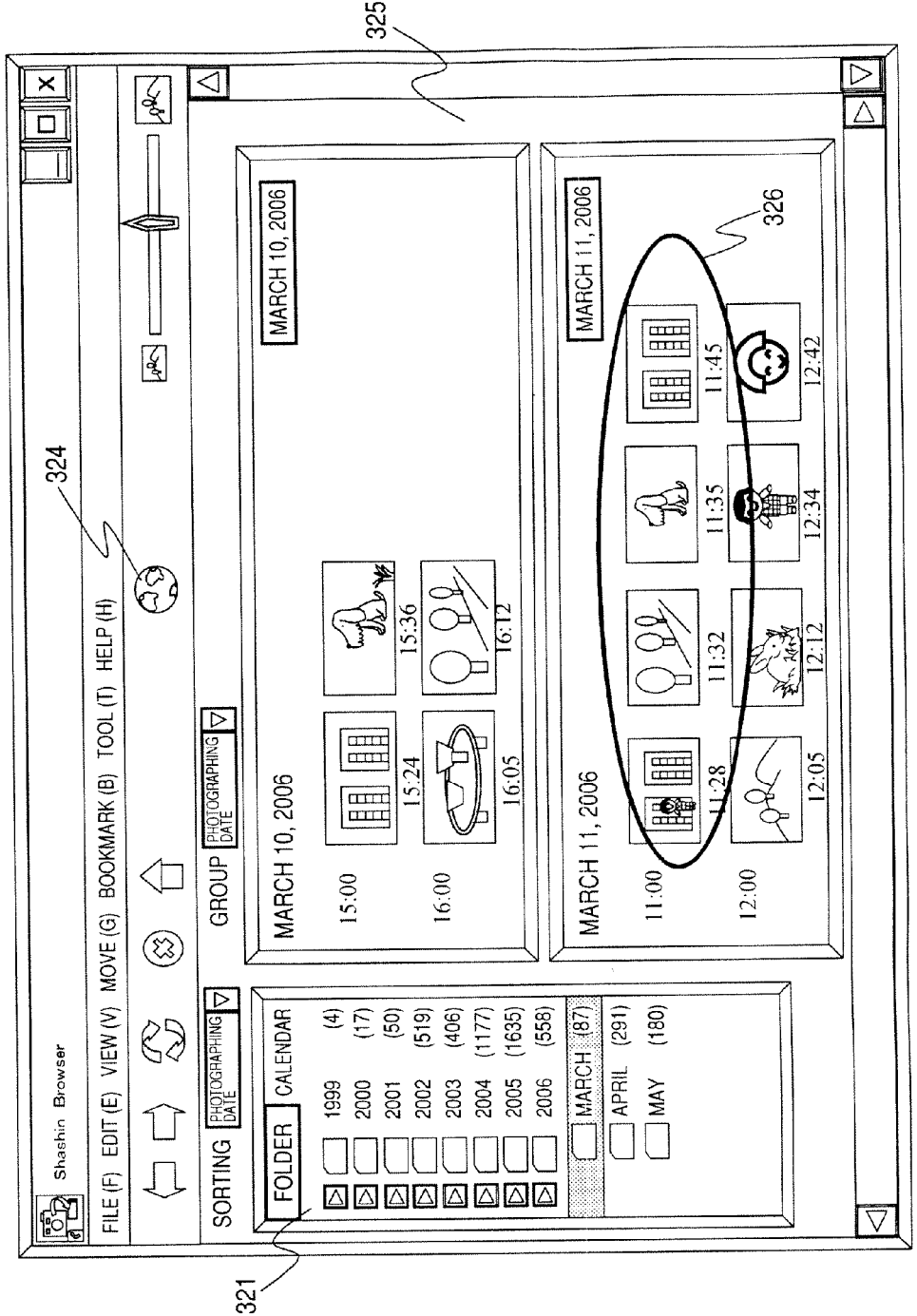
FIG. 8 is a view explaining an example of data displayed on the basis of execution of an image browsing program in a client.

FIG. 8 illustrates an example of executing day-unit image browsing, which is more specific than the calendar-type image browsing format shown in FIG. 7, according to the image browsing program 301. A list of images belonging to each date is displayed in an image list display region 325. The list of images is displayed on the basis of photographing date and time in formation set for each image in the order of early photographing time.

For example, a user sets an image that the user desires to display together with map display on the basis of the list display. In the example shown in the drawing, a region including images photographed from 11:00 to 12:00 on Mar. 11, 2006 is set as an image selection region 326. By starting the map display program after setting the image selection region 326, the selected images are set as an object of list display of an image list or pop-up images described above with reference to FIG. 3. The processing for starting the map display program is executed by clicking on a map display program starting icon 324 shown in the drawing.

Figure 9:
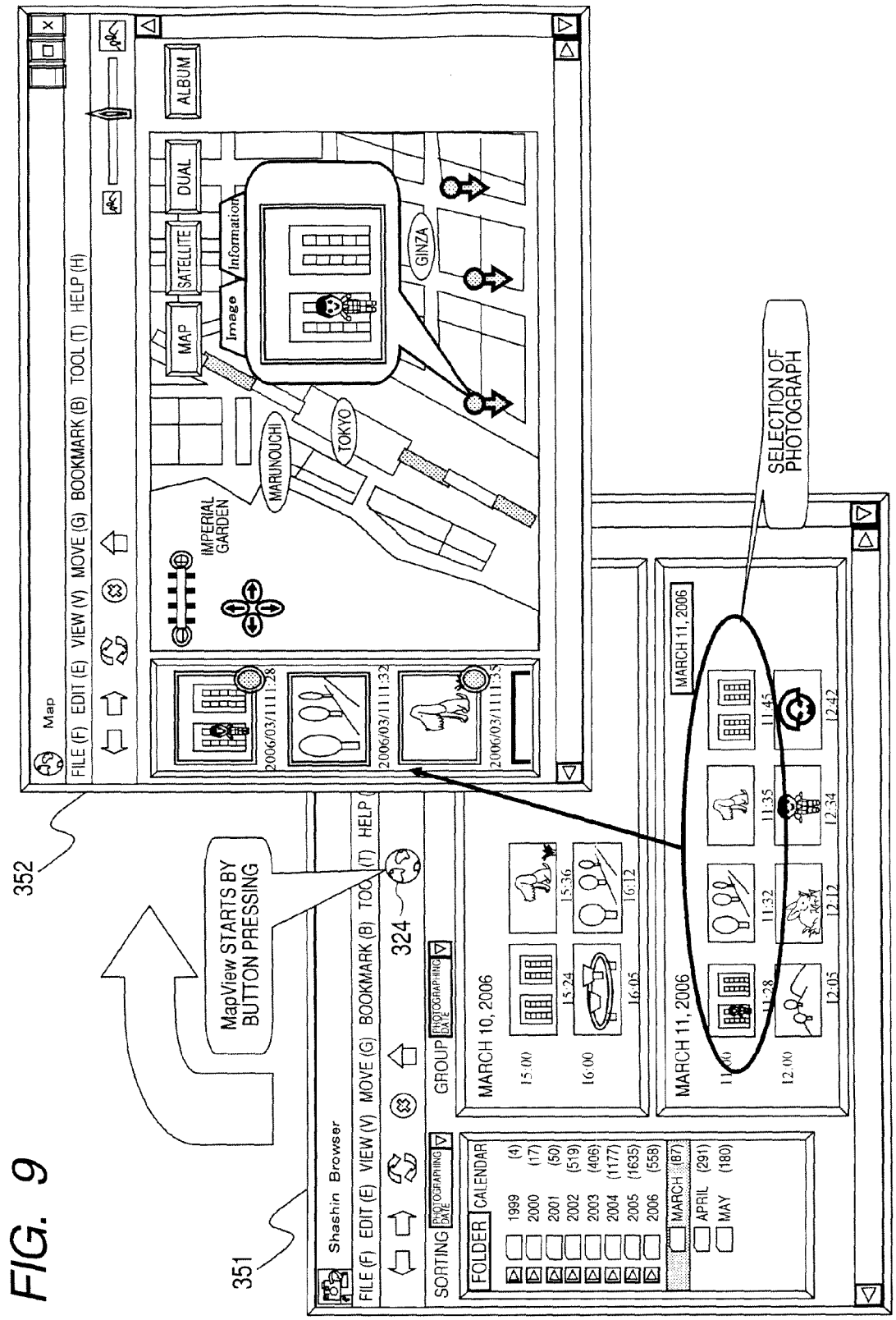
FIG. 9 is a view explaining processing for starting a map display program on an image browsing program execution screen.

As shown in FIG. 9, by clicking on the map display program starting icon 324 included in an image browsing program execution screen 351, the image browsing program execution screen 351 switches to a map display program execution screen 352. An image displayed on the map display program execution screen 352 is an image selected on the image browsing program execution screen 351. In addition, an HTML file in which path information of the selected image is recorded is created by clicking on the map display program starting icon 324, such that the map display program execution screen 352 shown in FIG. 9 is displayed.

Next, it will be described about an example of processing sequences executed by clicking on the map display program starting icon 324 shown in FIG. 9. As described above, in order to execute the display data described above with reference to FIG. 3, that is, data that allows an image, such as a photograph, to pop up on a map by setting a marker at the corresponding position on the map, it is necessary to create an HTML file in which a path of the display image is set and to acquire map data. The creation of the HTML file or the acquisition of the map may be executed using an external server or executed in a client.

Figure 10:
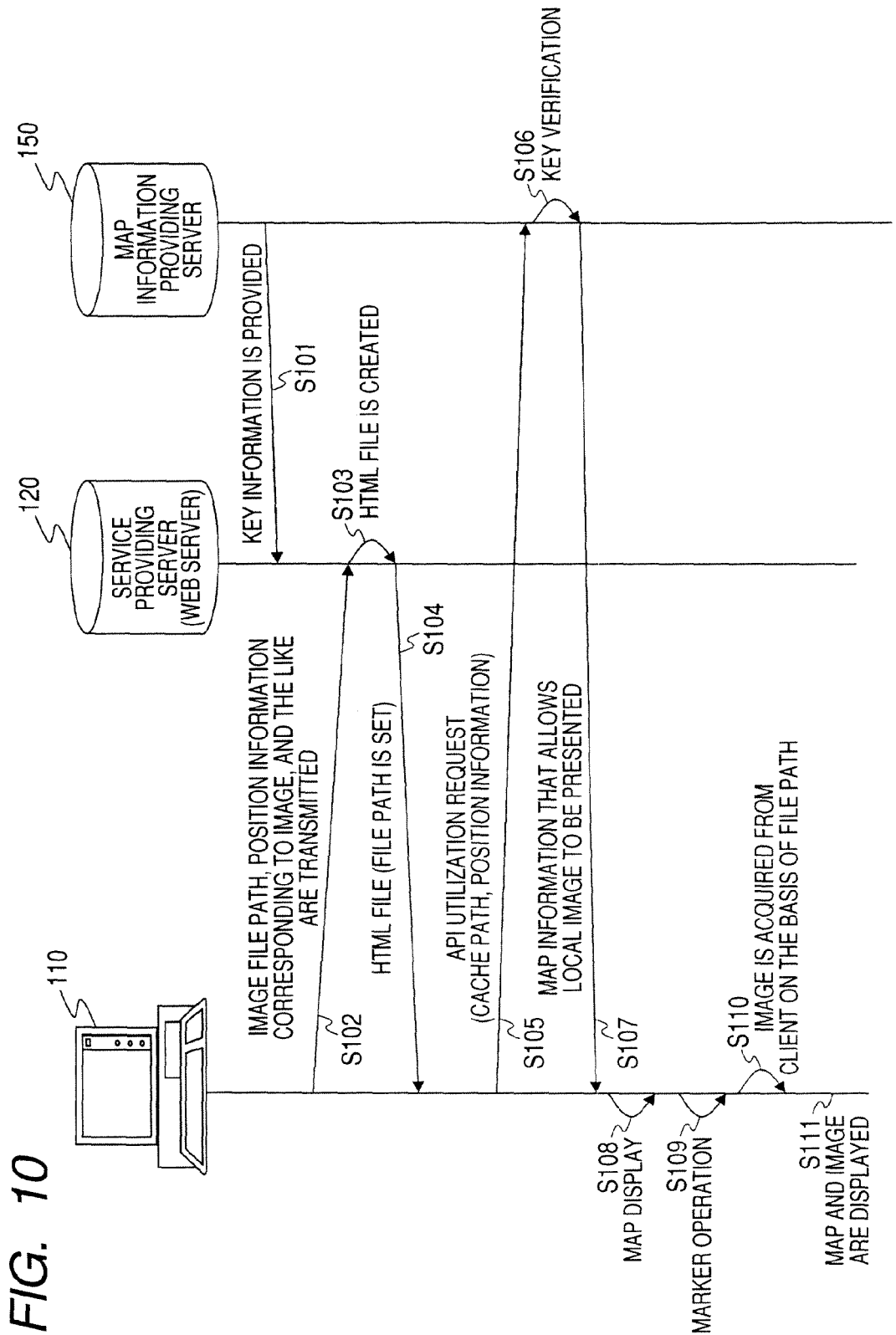
FIG. 10 is a view explaining sequences in which a client executes information display processing on the basis of map information provided by a map information providing server and an HTML file provided by a service providing server.

The sequence diagram shown in FIG. 10 shows a processing sequence in which the client 110 requests the service providing server 120 to create an HTML file and receives map information from the map information providing server 150 so as to display a map and an image. The client (user terminal) 110 that executes display of data, the service providing server 120 that creates an HTML file, and the map information providing server 150 that provides map information or satellite photograph information are shown from the left side in FIG. 10.

First, under the assumption that the service is executed, the map information providing server 150 gives to the service providing server 120 a permission to create an HTML file for information display using a map, which is provided by the map information providing server 150, and provide the created HTML file to the client. For example, a service during a predetermined period is permitted by license agreements. In this processing, in step S101, the map information providing server 150 creates a key for license and provides the key to the service providing server 120.

The client (user terminal) 110 that desires to execute the display of map data selects an image on the image browsing program execution screen 351, which has been described above with reference to FIG. 9, and then clicks on the map display program starting icon 324. By this clicking operation, a map display program starts, such that processing subsequent to step S102 is executed.

Then, in step S102, the client (user terminal) 110 transmits, that is, uploads to the service providing server 120 path information corresponding to image data stored in the client (user terminal) 110, that is, path information as access information of image data, such as photographs taken at tourist spots, and photographing location and photographing date and time information as attribute information of the image data. The upload data includes, for example, (a) image file path information, (b) image cache path information (file path information on thumbnail image), (c) image position information (longitude, latitude), and (d) image photographing date and time information, as described above with reference to FIG. 5.

In step S103, the service providing server 120 creates an HTML file for data display. The HTML file is an HTML file applied to the data display described above with reference to FIG. 4. The HTML file includes key information received from the map information providing server 150, codes for executing utilization of the API provided by the map information providing server 150, and various kinds of data transmitted from the client 110 to the service providing server 120, that is, HTML data configured to include link information, such as (a) image file path information, (b) image cache path information, (c) image position information (longitude, latitude), and (d) image photographing date and time information, and display format information thereof.

In step S104, the service providing server 120 transmits the created HTML file to the client 110. Then, in step S105, the client 110 executes the API utilization request with respect to the map information providing server 150 on the basis of the codes (Java (registered trademark) script) for utilizing the API included in the HTML file received from the service providing server 120. In this processing request, data that forms the HTML file received from the service providing server 120, that is, the key information 252 described above with reference to FIG. 4, other image file path information, photographing position information as image attribution information, and the like are included.

In step S106, the map information providing server 150 verifies the key information in response to the request from the client 110. That is, the map information providing server 150 verifies whether or not the request from the client 110 is a map utilization request based on the HTML file created by a licensed service providing server. Specifically, the map information providing server 150 verifies whether or not effective key information, which is provided to a licensed service providing server 120 from the map information providing server 150, is included in the request from the user terminal. If it is verified that the effective key information is not included, the service stops.

On the other hand, if it is verified that the effective key information is included, map data that allows data processing using the API of the map information providing server 150 is provided to the client 110 in step S107. That is, the map data is map information in which a marker causing a local image to be presented on the map is set.

In step S108, the client 110 displays a map using a browser function, for example. On the map, a marker (marker 202 in FIG. 3) for pop-up display of an image is set. In step S109, a marker operation, such as an operation of clicking on a marker, is executed. Then, in step S110, an image (or thumbnail image) is acquired from a storage unit of the client 110 on the basis of image file path information described in the HTML file. Then, in step S111, an image that pops up on the map is displayed on the user terminal.

The displayed image is image data stored in a device of the client. Moreover, in the sequence diagram shown in FIG. 10, an example has been described in which image data pops up on the basis of the image file path information described in the HTML file when the marker operation is executed in step S109. However, as described above with reference to FIG. 3, the image list 211 including a plurality of images is displayed as the display data. The list-displayed image is also read from the client 110, that is, the storage unit of the client 110 on the basis of the file path information set in the HTML file and is then displayed on a display unit of the client 110. The display timing of the image list is the same as that of the map display in step S108.

Thus, in the processing configuration according to the embodiment of the present invention, the image data as displayed local data is not read from a service providing server but is read from the client 110, that is, the storage unit of the client 110 on the basis of the file path information. Therefore, since the client does not need to transmit image data to the service providing server, the processing load is reduced and thus data display processing can be performed quickly.

Figure 11:
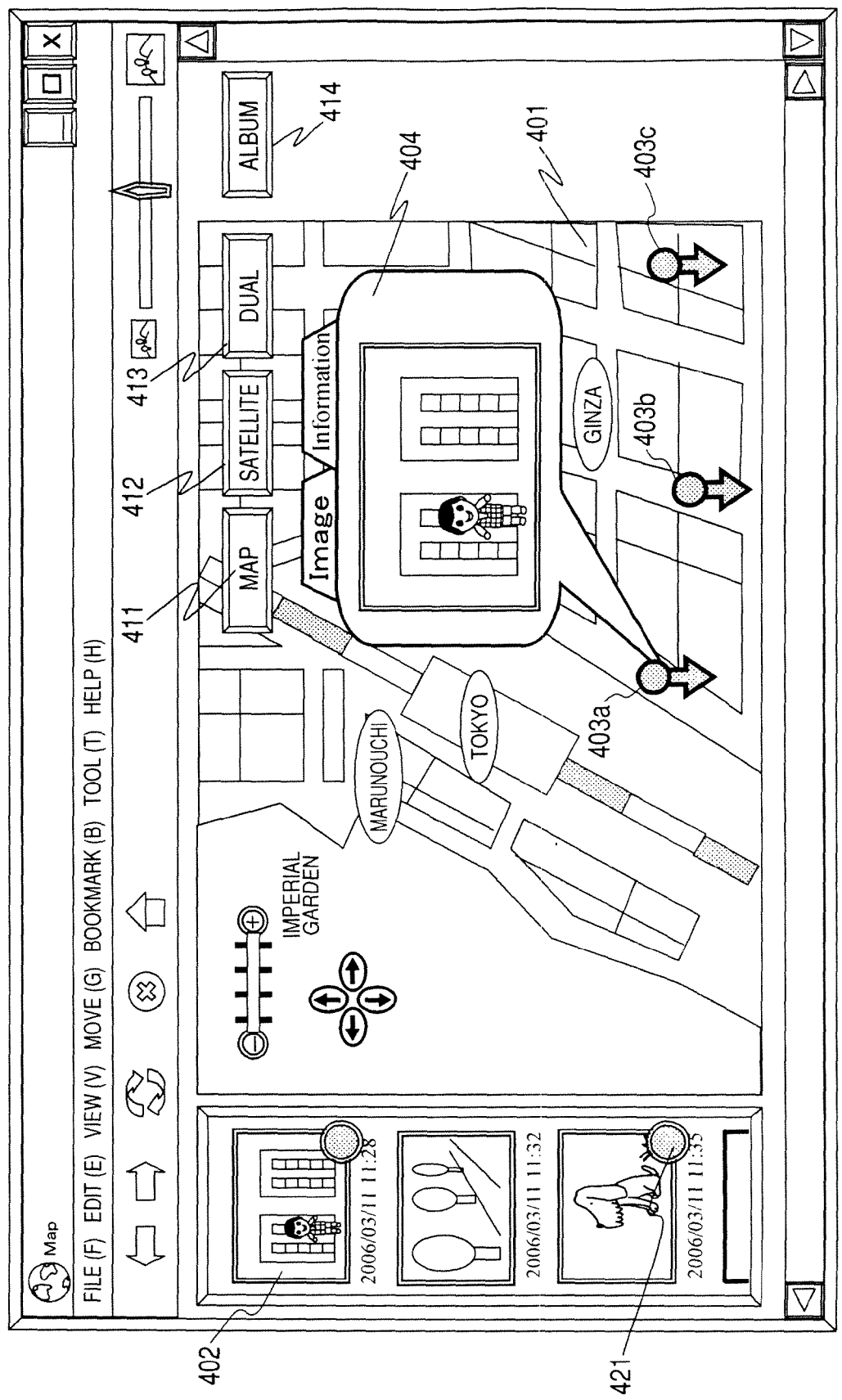
FIG. 11 is a view illustrating an example of display data displayed on a client.

Due to the processing described above, for example, the data display shown in FIG. 11 is realized on a display of the client 110. The display data shown in FIG. 11 is data displayed on a display of a client on the basis of execution of a map display program and is configured to include a map 401 and an image list 402. A marker 403 is set on the map 401 at the position corresponding to position information, such as the photographing position, included in attribution information of an image. By operating (for example, clicking) the marker 403, an image 404 having the position information indicated by the marker as attribution information pops up.

Both the image 404 that pops up and images displayed on the image list 402 are images read from a storage unit of the client on the basis of pass information recorded in the HTML file. The images displayed on the image list 402 are sorted in the order of photographing date and time to be displayed. Alternatively, various kinds of sorting processing based on attribution information corresponding to images may be executed.

Moreover, operation buttons 411 to 414 are displayed as display data. When a user operates the operation button [map] 411, a map is displayed on a screen. When the user operates the operation button [satellite] 412, a satellite photograph is displayed on the screen. When the user operates the operation button [dual] 413, a map and a satellite photograph are displayed together on the screen. When the user operates the operation button [album] 414, saving of data, updating of data, or the like is executed. It will be described later about processing based on an operation of the operation button [album] 414.

An identification icon 421 indicating whether or not recording of position information as attribution information is completed is displayed on an image displayed on the image list 402. In the case of an image displayed with the identification icon 421, the recording of position information as attribution information is completed. On the other hand, in the case of an image displayed without the identification icon 421, the position information as attribution information is not recorded. Preferably, the identification icon 421 is set using a drawing pattern such as the earth, satellite, or magnetic needle such that it can be visually understood that the position information is associated.

Figure 12:
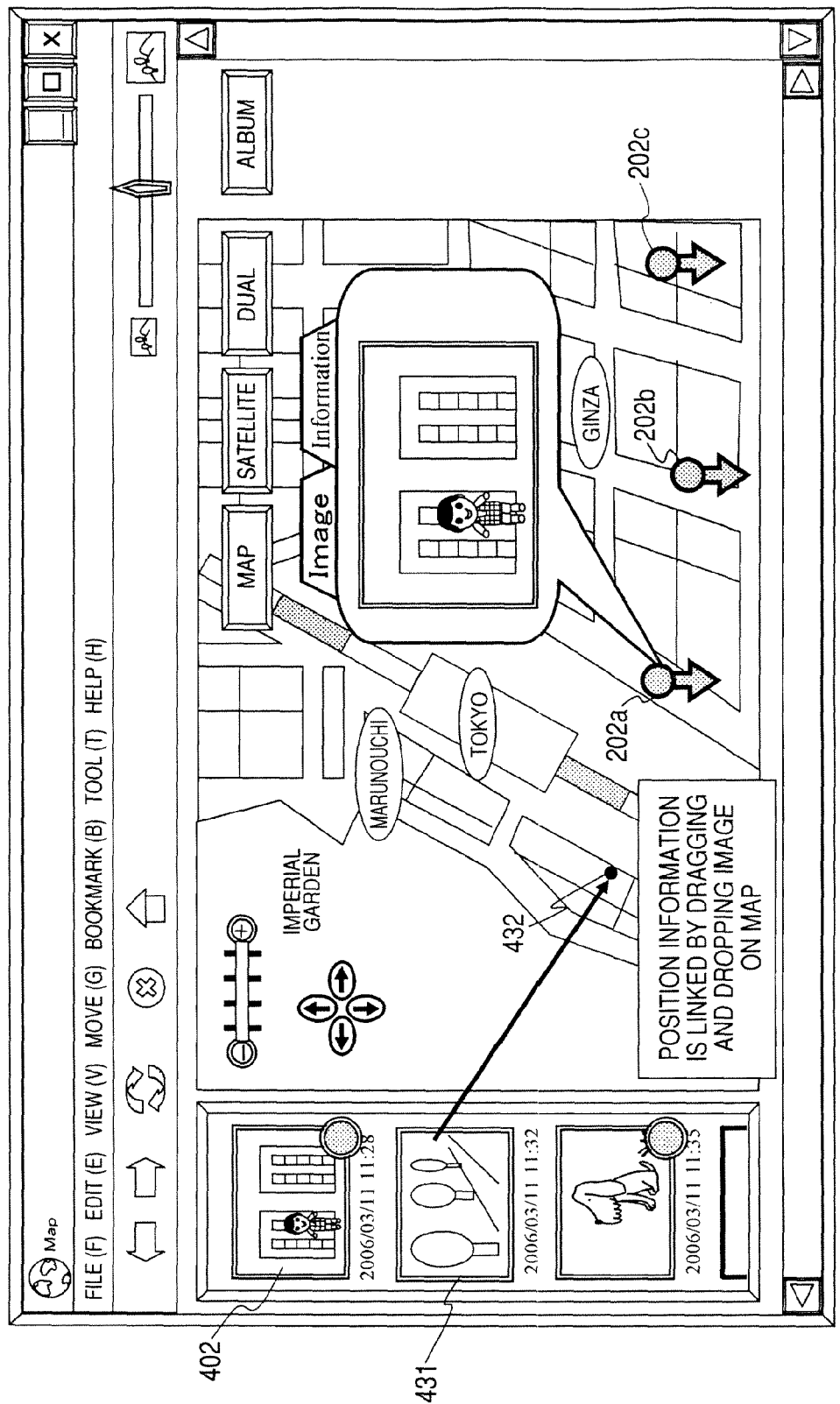
FIG. 12 is a view explaining processing for setting and recording position information on an image applying display data displayed on a client.

A user may drag and drop an image, which is not displayed with the identification icon 421, on a displayed map, as shown in FIG. 12, such that the position information (latitude, longitude) on the map where the image is dragged and dropped is recorded as attribution information of the image. In addition, an image browsing program execution screen may be displayed together with a map display program execution screen so that the same position information acquisition and setting are executed even if an image selected on the image browsing program execution screen is dragged and dropped on a map of the map display program execution screen.

Such position information recording processing is performed according to a position information recording processing program included in a map display program. Corresponding position information (latitude, longitude) may be added on the displayed map. By a user's operation, there is executed processing in which position information (latitude, longitude) of the position at which the image is dropped, for example, position information (latitude, longitude) of a point 432 in FIG. 12 is acquired and the acquired position information (latitude, longitude) is recorded in an attribution information recording region of the dragged and dropped image 431.

Thus, in the configuration according to the embodiment of the present invention, it is possible to easily record position information with respect to an image on which position information is not recorded.

Figure 13:
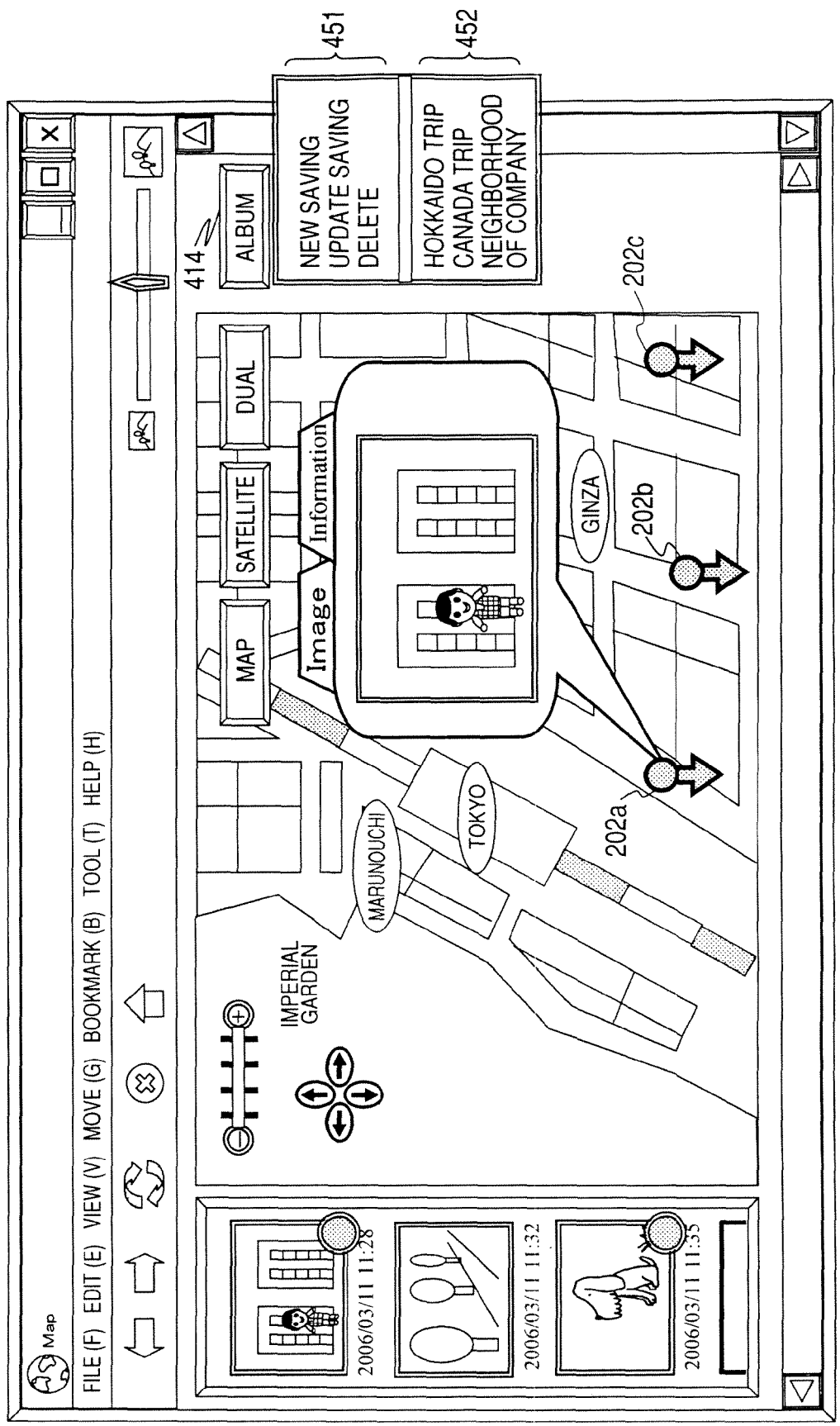
FIG. 13 is a view explaining processing for saving or updating an album applying display data displayed on a client.

Next, it will be described about processing based on an operation of the operation button [album] 414 with reference to FIG. 13. When clicking on the operation button [album] 414, a processing selection part 451 and an album selection part 452 are displayed as shown in FIG. 13. Data displayed on the album selection part 452 is an album that the user has already created. An album is set as a group of image file path information corresponding to one or more image files, for example.

In addition, an album may be configured to include corresponding position information of an image file, map information that is currently displayed, or an HTML file applied in display processing as well as the image file path information. Through such a storage processing configuration, it becomes possible to execute an HTML file included in the album, and thus processing for newly creating an HTML file can be omitted.

Processing information that may be executed by the user is displayed on the processing selection part 451. Specifically, there are [new saving], [update saving], and [delete]. In the case of selecting and executing the [new saving], an album including a group of currently selected images is set as a new album to be then saved. In the case of selecting and executing the [update saving], processing for updating an existing album is executed. In the case of selecting and executing [delete], a designated album is deleted.

When an album is selected from the album selection part 452, an image is read and displayed on the basis of an image file path included in the album. In addition, according to the path included in the album, a map at the corresponding position is read and displayed on the basis of position information corresponding to an image file. A map is acquired from a storage unit of a client or an external server and is then displayed.

Figure 14:
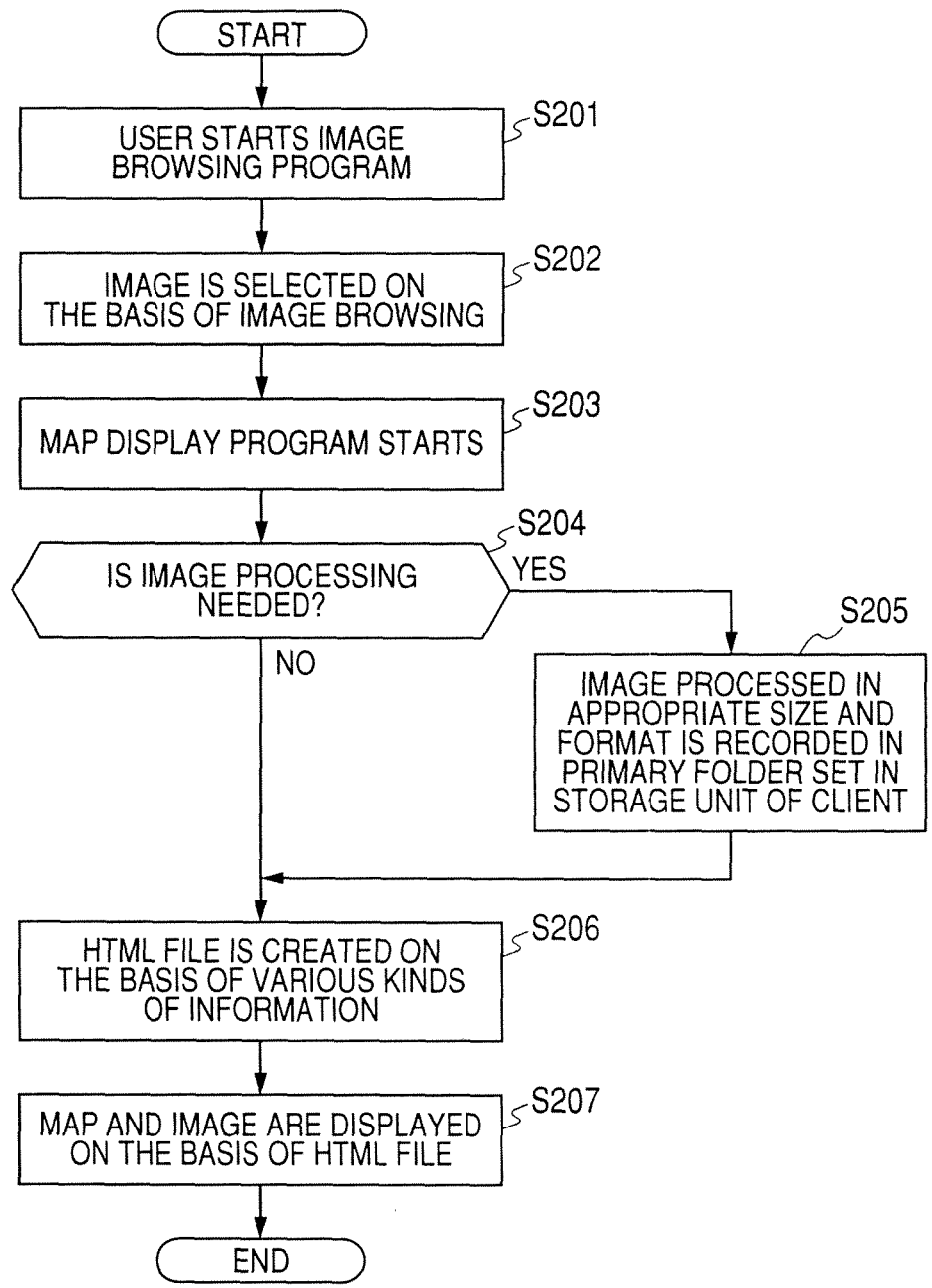
FIG. 14 is a flow chart explaining processing sequences in a client.

Next, it will be described about processing sequences executed in an information processing apparatus according to an embodiment of the present invention, that is, the client 110 with reference to a flow chart shown in FIG. 14. In step S201, a user of the client 110 starts an image browsing program. In the starting processing, for example, the image list display processing described above with reference to FIGS. 7 and 8 are executed. In step S202, the user selects an image, which is to be displayed together with map display, from a list of images. In step S203, the user starts a map display program. For example, as described above with reference to FIG. 9, processing for operating (clicking) the map display program starting icon 324 is performed.

In the starting processing, for example, the processing described above with reference to FIG. 10 is executed. Further, in this processing, in the case when a processed image, such as a thumbnail image, corresponding to a selected image, is not created, processing for creating the processed image may be performed. Determination on the processing is made in step S204. Specifically, in the case when there is a selected image for which an image, such as a thumbnail, is not created, an image processed according to the appropriate size and format is created and is then stored in a primary folder set in a storage unit of the client in step S205. In addition, in the case when a motion picture is selected in the image browsing program, a thumbnail corresponding to a representative image, such as a battle, of motion picture data is created.

Furthermore, an example of the image processing is not limited to a thumbnail but various types of processing may be performed. For example, the image browsing program may cause rotation flag information included in EXIF set as an image data storage file to be recognized such that an image is rotatably displayed. In the case when such processing is not possible in a map display program, the image browsing program or the map display program may create an image file, which is processed to be displayed in the appropriate form, at the time of execution of the map display program in consideration of the rotation flag information set in the EXIF.

In step S206, an HTML file which describes image file path information, position information, and the like is created. Then, in step S207, a map at the position corresponding to position information set as attribution information of an image is acquired and is then displayed together with the image list. The displayed data is the display data shown in FIG. 11, for example.

Furthermore, in the case when a plurality of images are included in the selected image, different position information corresponds to each of the images but a map region at the position, which corresponds to image data having the newest date and time information (photographing date and time) or oldest date and time information of the selected image, is selected and displayed.

Hereinafter, it will be described about the functional configuration of apparatuses that execute the above processing with reference to FIG. 15. FIG. 15 is a block diagram illustrating the configuration of one client 110 connected to a network. The client 110 includes a user interface 471 as data I/O unit, a data processing unit 472, a storage unit 473, and a communication unit 474, and may communicate with the service providing server 120, the map information providing server 150, and the like through a communication unit 474. The client 110 has the same configuration as a general PC. A specific example of the hardware configuration will be described later.

An image file is recorded in the storage unit 473 of the client 110. The image file is recorded as a file based on the EXIF format, for example. In addition, position information, date and time information, and the like as attribution information corresponding to images, are recorded in the image file. Further, image data such as a thumbnail created as a primary file and a program for executing the processing described above, that is, the image browsing program, the map display program, and the like are stored in the image file.

The data processing unit 472 is configured to include a CPU for executing a program and executes various kinds of processing according to the image browsing program and the map display program described above. For example, the data processing unit 472 executes image selection processing according to the image browsing program, map display processing according to the map display program, processing for setting position information corresponding to the image described with reference to FIG. 12, processing for saving and updating an album described with reference to FIG. 13, and the like.

In the processing according to the map display program, data for creation of an HTML file, that is, data including (a) image file path information, (b) image cache path information (file path information on thumbnail image), (c) image position information (longitude, latitude), and (d) image photographing date and time information is acquired and then the HTML file corresponding to the display data shown in FIG. 11 is created as processing according to the start of the map display program. Alternatively, the above information is transmitted to the service providing server 120 so as to output an HTML file creation request, processing for acquiring map information, such as a map or a satellite photograph, from the map information providing server 150 on the basis of information recorded in the acquired HTML file is executed, and the map information is displayed on a display unit. Moreover, processing for acquiring an image file from a storage unit on the basis of an image file path recorded in the HTML file and then displaying the acquired image file on a display unit is executed.

The user interface 471 includes a display unit serving as a user input unit and a data output unit and performs output of the display information, which has been described above with reference to FIG. 11, as data output processing. In addition, the client 110 performs communication with the service providing server 120 and the map information providing server 150 through the communication unit 474 under the control of the data processing unit 472, receives an HTML file from the service providing server 120, and acquires a map, a satellite photograph, and the like from the map information providing server 150 and displays the acquired map or satellite photograph on the display unit of the user interface 471.

The data processing unit 472 executes processing for displaying an image browsing screen, which corresponds to an image file stored in the storage unit 473, on a display unit that forms the user interface 471 and displaying a map at the position, which corresponds to the position information included in attribution information of a selected image, on the basis of user's input of image selection information and map display request. For example, the data processing unit 472 executes display of a map at the position corresponding to position information included in attribution information of an image having the newest or oldest date and time information included in attribute information of images selected by the user. Further, the data processing unit 472 executes processing for displaying a map in which a marker is set at the position corresponding to position information included in the attribution information of the selected image. Furthermore, the data processing unit 472 executes processing for reading an image file, in which position information corresponding to the setting position of each marker is set as the attribution information, in response to a user's operation on the marker and then displaying the read image file.

In addition, the data processing unit 472 executes processing for creating or acquiring an information display file, in which image file path information as access information corresponding to the selected image is set, on the basis of the user's input of image selection information and map display request and then executes map information display processing for displaying the map and the selected image together. For example, the data processing unit 472 executes processing for transmitting position information corresponding to an image file designated by the image file path, as data for creation of an HTML file, to the service providing server 120. In addition, the data processing unit 472 executes processing for displaying map information, which includes a marker indicating the position information corresponding to the image file, on the display unit on the basis of the HTML file received from the service providing server. In addition, the data processing unit 472 executes processing for acquiring an image file from the storage unit 473 of the client 110 according to the image file path recorded in the HTML file on the basis of an operation of a corresponding marker and then displaying the acquired image file on the display unit.

In the display processing, the data processing unit 472 displays an image list, which serves as a list of images selected on the basis of image selection information by the user, and an identification icon indicating whether or not the position information is recorded in attribution information corresponding to a display image of the image list.

Furthermore, the data processing unit 472 executes processing for acquiring position information, which corresponds to the map position of a place where a display image of the image list is to be dragged and dropped, on the basis of user's dragging and dropping of the display image of the image list onto the display map and then recording the acquired position information as position information corresponding to the image to be dragged and dropped.

Moreover, after the display processing of the map information that is displayed on the basis of the user's input of image selection information and map display request, the data processing unit 472 executes processing for newly creating or updating and saving an album including an image file path as access information of an image selected when displaying the map information on the basis of an input of a request for the processing for saving or updating an album. In the processing for saving an album, the data processing unit 472 executes processing for saving position information corresponding to an image, a map displayed on a display unit or access information of the map, an HTML file applied to display information displayed on the display unit, and the like as album data.

Finally, the hardware configuration of an information processing apparatus that realize a client for executing the above processing will be described with reference to FIG. 16. A CPU (central processing unit) 501 functions as a main execution body of the data processing unit, which has been described in the above embodiment, executing processing corresponding to OS (operating system) The CPU 501 executes various kinds of processing based on an image browsing program and a map display program. For example, the CPU 501 executes the image selection processing according to the image browsing program, the map display processing according to the map display program, the processing for setting position information corresponding to the image described with reference to FIG. 12, the processing for saving and updating an album described with reference to FIG. 13, and the like. As the processing according to the map display program, for example, creation or analysis of an HTML file, information display processing, execution of Java (registered trademark) script, data communication processing control, and the like are performed. Such processing is executed according to a computer program stored in a data storage unit, such as a ROM or a hard disk, of each information processing apparatus.

A ROM (read only memory) 502 serves to store a program that the CPU 501 uses, that is, an image browsing program and a map display program, computation parameters, and the like. A RAM (random access memory) 503 serves to store a program used at the time of execution of the CPU 501, parameters that appropriately vary in the execution, and the like. The CPU 501, the ROM 502, and the RAM 503 are connected to one another by a host bus 504, such as a CPU bus.

The host bus 504 is connected to an external bus 506, such as a PCI (peripheral component interconnect/interface) bus, through a bridge 505.

A keyboard 508 and a pointing device 509 serve as input devices operated by a user. A display 510 is a liquid crystal display or a CRT (cathode ray tube) and serves to display various kinds of information in a text or an image.

HDD (hard disk drive) 511 includes a hard disk therein, drives the hard disk, and records or reproduces a program or information executed by the CPU 501. The hard disk is used as a storage unit that stores image information, image attribution information, and the like and stores various kinds of computer programs, such as a data processing program.

A drive 512 reads data or a program recorded in a removable recording medium 521 mounted thereon, such as a magnetic disk, an optical disk, a magneto-optic disk, or a semiconductor memory, and transmits the read data or program to the RAM 503 connected thereto through an interface 507, the external bus 506, the bridge 505, and the host bus 504.

A connection port 514 is a port for connection with an externally connected device 522 and has connecting parts, such as USB and IEEE1394. The connection port 514 is connected to the CPU 501 or the like through the interface 507, the external bus 506, the bridge 505, and the host bus 504. A communication unit 515 is connected to a network and executes communication with a client or a network-connected server.

In addition, the example of the hardware configuration of the information processing apparatus shown in FIG. 16 is an example of an apparatus configured by applying a PC, but the system according to the embodiment of the present invention is not limited to the configuration shown in FIG. 16. For example, other apparatuses capable of executing the processing described in the above embodiment may be applied. In addition, the client apparatus may be any information processing apparatuses such as a camera, a mobile phone, and the like without being limited to the PC.

Hereinbefore, the specific embodiment of the present invention has been described in detail. However, it is apparent to those skilled in the art that various modifications or substitutions of the above embodiment may be made without departing from the spirit and scope of the present invention. That is, since the present invention has been disclosed in the form of only illustration, the present invention should not be interpreted restrictively. Thus, the scope of the present invention should be determined on the basis of the appended claims.

Further, the series of processing described in the specification may be executed by hardware, software, or a composite configuration of both hardware and software. In the case of executing the processing by the use of software, a program that records processing sequences may be installed in a memory within a computer built in dedicated hardware so as to be executed, or the program may be installed in a general-purpose computer capable of executing various kinds of processing so as to be executed.

For example, a program may be recorded beforehand in a hard disk or a ROM (read only memory) serving as a recording medium. Alternatively, a program may be temporarily or permanently stored (recorded) in a removable recording medium including a flexible disc, a CD-ROM (compact disc read only memory), a MO (magneto optical) disc, a DVD (digital versatile disc), a magnetic disc, and a semiconductor memory. Such removable recording medium may be supplied as so-called package software.

Alternatively, in addition to installing a program from the removable recording medium in a computer, the program may be wirelessly transmitted from a download site to the computer or wire-transmitted from the download site to the computer through a network, such as a LAN (local area network) or Internet. Then, the computer may receive the program that is wirelessly transmitted or wire-transmitted as described above and then install the program in a recording medium, such as a hard disc provided therein.

Furthermore, the variety of processing described in the specification may be executed not only in a time-sequential manner as described herein but in parallel or separately according to a processing ability of an apparatus that executes the processing or according to the necessity. Furthermore, the system in the specification is a logic group of a plurality of apparatuses. That is, the system in the specification is not limited to a system in which apparatuses having respective configurations exist in the same casing.

As described above, according to the configuration according to the embodiment of the present invention, it is possible to easily visually recognize photographing positions and temporal relation of display images and to cause an image, which is not associated with position information, to be associated with the position information in a simple way in the configuration in which a map and images are displayed together. In the configuration of the information processing apparatus according to the embodiment of the present invention, an image list in which local data, such as photographs, stored in a storage unit of a client is arranged in the order of photographing date and time is displayed together with map information provided by a map information providing server, for example. Moreover, an identification icon indicating whether or not the position information is associated with a display image is set on the display image. In addition, by dragging and dropping an image, which is not associated with position information, on the map, the position information on the map where the image is dragged and dropped may be acquired and set as the position information of the image. Thus, there is provided an apparatus that realizes highly convenient processing.

It should be understood by those skilled in the art that various modifications, combinations, sub-combinations and alternations may occur depending on design requirements and other factors insofar as they are within the scope of the appended claims or the equivalents thereof.

What is claimed is:

1. An information processing apparatus that executes information display processing, comprising:
   circuitry configured to execute control of information display of a display unit, wherein
   the circuitry is further configured to execute processing for display of an image browsing screen, which corresponds to image data stored in a storage unit, on the display unit and to execute processing for display of a map, on the display unit, upon receipt of user input including selection information including a selected plurality of images, each image of the selected plurality of images having corresponding time information associated with image capture included in associated attribute information, and a map view launch command, the display of the map on the display unit displaying a map region corresponding to one of: first position information included in first associated attribute information of a first one of the selected plurality of images having earliest time information included in the first associated attribute information; and second position information included in second associated attribute information of a second one of the selected plurality of images having latest time information included in the second associated attribute information,
   the circuitry is further configured to execute processing for displaying an image list, which is a list of the selected plurality of images, together with the map, at a time when executing map information display processing occurs,
   the selected plurality of images in the image list are ordered based on the time information associated with image capture included in the associated attribute information, and the circuitry is further configured to execute processing for displaying an identification icon next to an image from the selected plurality of images in the image list indicating whether the image from the selected plurality of images in the image list has a corresponding map position information.

2. The information processing apparatus according to claim 1, wherein the circuitry is further configured to execute processing for display of together with the map, an image that has not been associated with position information and to execute processing for associating position information with said image when said user inputs a position on the map, said image that has not been associated with position information being an image from the selected plurality of images.

3. The information processing apparatus according to claim 1, wherein the map view launch command is initiated by clicking an icon on the image browsing screen.

4. The information processing apparatus according to claim 1, wherein the list of selected plurality of images is displayed on the display unit in a display area separate from the map.

5. The information processing apparatus according to claim 1, wherein the circuitry is further configured to allow a user to drag and drop each image of the selected plurality of images from the image list onto the map that does not have said corresponding map position information.

6. An information processing method executed in an information processing apparatus which includes circuitry, comprising:
   executing, in the circuitry, data processing to control information display on a display unit, wherein
   the data processing includes processing for displaying an image browsing screen, which corresponds to image data stored in a storage unit, on the display unit and executing processing for display of a map on the display unit, upon receipt of user input including selection information including a selected plurality of images, each image of the selected plurality of images having corresponding time information associated with image capture included in associated attribute information, and a map view launch command, the display of the map on the display unit displaying a map region corresponding to one of: first position information included in first associated attribute information of a first one of the selected plurality of images having earliest time information included in the first associated attribute information; and second position information included in second associated attribute information of a second one of the selected plurality of images having latest time information included in the second associated attribute information,
   the data processing includes processing for displaying an image list, which is a list of the selected plurality of images, together with the map, at a time when executing map information display processing occurs,
   the selected plurality of images in the image list are ordered based on the time information associated with image capture included in the associated attribute information, and
   the data processing includes processing for displaying an identification icon next to an image from the selected plurality of images in the image list indicating whether the image from the selected plurality of images in the image list has a corresponding map position information.

7. The information processing method according to claim 6, wherein each operation of the method executed in the information processing apparatus is executed by one of a personal computer, a digital camera, or a mobile phone.

8. The information processing method according to claim 6, wherein the map view launch command is initiated by clicking an icon on the image browsing screen.

9. A non-transitory computer readable storage medium with instructions which, when executed by an information processing apparatus which includes circuitry, cause the information processing apparatus to execute an information processing method, said information processing method comprising:
   executing, in the circuitry, data processing to control information display on a display unit, wherein
   the data processing includes, processing for displaying an image browsing screen, which corresponds to image data stored in a storage unit, on the display unit and executing processing for display of a map, on the display unit, upon receipt of user input including selection information including a selected plurality of images, each image of the selected plurality of images having corresponding map position information and time information associated with image capture included in associated attribute information, and a map view launch command, the display of the map on the display unit displaying a map region corresponding to one of: first position information included in first associated attribute information of a first one of the selected plurality of images having earliest time information included in the first associated attribute information; and second position information included in second associated attribute information of a second one of the selected plurality of images having latest time information included in the second associated attribute information,
   the data processing includes processing for displaying an image list, which is a list of the selected plurality of images, together with the map, at a time when executing map information display processing occurs, and
   the selected plurality of images in the image list are ordered based on the time information associated with image capture included in the associated attribute information, and
   the data processing includes processing for displaying an identification icon next to an image from the selected plurality of images in the image list indicating whether the image from the selected plurality of images in the image list has a corresponding map position information.

10. The non-transitory computer readable storage medium according to claim 9,
   wherein the data processing includes processing for executing display of the map in which a position marker corresponding to position information included in attribute information of a selected image is set.

11. The non-transitory computer readable storage medium according to claim 9,
   wherein the data processing includes processing for reading and displaying image data in which position information corresponding to a set position of a marker is set as attribute information on a basis of a user's operation on the marker.

12. The non-transitory computer readable storage medium-according to claim 9,
   wherein the data processing includes map information display processing for creating or acquiring an information display file, in which image reference information as access information corresponding to a selected image is set, on a basis of a user's input of image selection information and map display request and displaying a map and the selected image together.

13. The non-transitory computer readable storage medium according to claim 9,
wherein the data processing includes processing for displaying the identification icon indicating whether or not position information is recorded in attribution information corresponding to a display image on the image list.

14. The non-transitory computer readable storage medium-according to claim 13, wherein the information processing method being executed further comprises:
executing, at the circuitry, processing for acquiring position information, which corresponds to a map position of a place where a display image of the image list is dragged and dropped, on a basis of a user's dragging and dropping of the display image of the image list onto a display map and then recording the acquired position information as position information corresponding to the display image that is dragged and dropped.

15. The non-transitory computer readable storage medium-according to claim 14,
wherein the position information is recorded in an image file together with dragged and dropped image data.

16. The non-transitory computer readable storage medium-according to claim 9, wherein the information processing method being executed further comprises:
executing, at the circuitry, a saving processing for creating new or updating and then saving, with respect to images selected at a time of display of map information, selected image group information including at least reference information of selected image data.

17. The non-transitory computer readable storage medium-according to claim 16,
wherein the data saving processing is processing for saving data including position information corresponding to an image.

18. The non-transitory computer readable storage medium-according to claim 16,
wherein the data saving processing is processing for saving data including the map, which is being displayed on the display unit, or access information of the map.

19. The non-transitory computer readable storage medium-according to claim 16,
wherein the data saving processing is processing for saving data including a display structure description file associated with information being displayed on the display unit.

20. The non-transitory computer readable storage medium-according to claim 19,
wherein the display structure description file is an HTML file.

21. The non-transitory computer readable storage medium according to claim 9, wherein the map view launch command is initiated by clicking an icon on the image browsing screen.

* * * * *